United States Patent
Yang et al.

(10) Patent No.: US 10,795,583 B2
(45) Date of Patent: Oct. 6, 2020

(54) AUTOMATIC DATA PLACEMENT MANAGER IN MULTI-TIER ALL-FLASH DATACENTER

(71) Applicant: Samsung Electronics Co., Ltd., Suwon-si, Gyeonggi-do (KR)

(72) Inventors: Zhengyu Yang, Malden, MA (US); T. David Evans, San Diego, CA (US); Allen Andrews, El Cajon, CA (US); Clay Mayers, San Diego, CA (US); Thomas Rory Bolt, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/887,980

(22) Filed: Feb. 2, 2018

(65) Prior Publication Data
US 2019/0026030 A1 Jan. 24, 2019

Related U.S. Application Data

(60) Provisional application No. 62/534,647, filed on Jul. 19, 2017.

(51) Int. Cl.
*G06F 3/06* (2006.01)
*G06F 9/455* (2018.01)

(52) U.S. Cl.
CPC .......... *G06F 3/0611* (2013.01); *G06F 3/0647* (2013.01); *G06F 3/0688* (2013.01);
(Continued)

(58) Field of Classification Search
None
See application file for complete search history.

(56) References Cited

U.S. PATENT DOCUMENTS 8,656,134 B2 2/2014 Gounares et al.
8,775,868 B2 7/2014 Colgrove et al.
(Continued)

FOREIGN PATENT DOCUMENTS

CN 105808150 A 7/2016
KR 101652324 B1 8/2016

OTHER PUBLICATIONS

Adinetz et al., "Performance Evaluation of Scientific Applications on POWER8", PMBS 2014, LNCS 8966, p. 24-45, 2015.
(Continued)

*Primary Examiner* — Kaushikkumar M Patel
(74) *Attorney, Agent, or Firm* — Renaissance IP Law Group LLP

(57) ABSTRACT

A system for performing auto-tiering is disclosed. The system may include a plurality of storage devices offering a plurality of resources and organized into storage tiers. The storage devices may store data for virtual machines. A receiver may receive I/O commands and performance data for the virtual machines. A transmitter may transmit responses to the I/O commands. An auto-tiering controller may select storage tiers to store the data for the virtual machines and may migrate data between storage tiers responsive to the performance data. The selection of the storage tiers may optimize the performance of all virtual machines across all storage tiers, factoring the change in performance of the virtual machines and a migration cost to migrate data between storage tiers.

20 Claims, 13 Drawing Sheets

(52) U.S. Cl.
CPC .. *G06F 9/45558* (2013.01); *G06F 2009/4557* (2013.01); *G06F 2009/45579* (2013.01); *G06F 2009/45583* (2013.01); *G06F 2009/45591* (2013.01)

(56) References Cited

U.S. PATENT DOCUMENTS

| | | | |
|---|---|---|---|
| 9,183,151 | B2 | 11/2015 | Uttamchandani et al. |
| 9,201,751 | B1 | 12/2015 | Muthirisavenugopal et al. |
| 9,513,835 | B2* | 12/2016 | Alatorre ............... G06F 3/0647 |
| 9,535,844 | B1 | 1/2017 | Cooney et al. |
| 9,639,277 | B2 | 5/2017 | Nakajima |
| 9,665,621 | B1 | 5/2017 | Reiner et al. |
| 9,983,795 | B1* | 5/2018 | Naamad ................. G06F 3/061 |
| 10,095,621 | B1 | 10/2018 | Birke et al. |
| 10,254,970 | B1* | 4/2019 | Martin .................. G06F 3/0611 |
| 10,289,958 | B1* | 5/2019 | Tzur ........................ G06N 5/04 |
| 2009/0204959 | A1 | 8/2009 | Anand et al. |
| 2013/0007254 | A1 | 1/2013 | Fries |
| 2013/0297872 | A1* | 11/2013 | Hyde, II ............... G06F 3/0611 711/117 |
| 2014/0025890 | A1 | 1/2014 | Bert et al. |
| 2014/0156965 | A1 | 6/2014 | Yang et al. |
| 2014/0359224 | A1 | 12/2014 | Bisht |
| 2015/0058540 | A1 | 2/2015 | Bazzani |
| 2016/0179582 | A1 | 6/2016 | Skerry et al. |
| 2016/0342447 | A1* | 11/2016 | Richter ................. G06F 9/5083 |
| 2017/0046098 | A1 | 2/2017 | Yang et al. |
| 2017/0223107 | A1 | 8/2017 | Dayan et al. |
| 2017/0235590 | A1 | 8/2017 | Sinha et al. |
| 2017/0235609 | A1* | 8/2017 | Wires ................... G06F 9/5016 718/104 |
| 2017/0262204 | A1 | 9/2017 | Dornemann et al. |
| 2017/0371562 | A1* | 12/2017 | Delaney ............... G06F 3/0647 |
| 2018/0018379 | A1* | 1/2018 | Eda ....................... G06F 16/185 |
| 2018/0067961 | A1 | 3/2018 | Yang et al. |
| 2018/0088803 | A1* | 3/2018 | Zhou ........................ G06F 3/061 |
| 2018/0210656 | A1* | 7/2018 | Sato ..................... G06F 3/0605 |
| 2018/0357228 | A1* | 12/2018 | Chen .................... G06F 16/164 |

OTHER PUBLICATIONS

Notice of Allowance for U.S. Appl. No. 15/891,350, dated Jul. 2, 2019.
C. Ding et al., "Predicting whole-program locality through reuse distance analysis," in ACM SIGPLAN Notices, vol. 38, No. 5 ACM, 2003, pp. 245-257.
D. Arteaga et al., "Cloudcache: On-demand flash cache management for cloud computing." in FAST, 2016, pp. 355-369.
D. Narayanan et al., "Write off-loading: Practical power management for enterprise storage," ACM Transactions on Storage, vol. 4, No. 3, pp. 10:1-10:23, 2008.
E. O'Neil et al., "The LRU-K page replacement algorithm for database disk buffering," in Proceedings of the 1993 ACM SIGMOD international conference on Management of data, Washington, DC, 1993, pp. 297-306.
F. Meng et al., "vCacheShare: automated server flash cache space management in a virtualization environment," in USENIX ATC, 2014.
H. Kim et al., "Flash-conscious cache population for enterprise database workloads." in ADMS@ VLDB, 2014, pp. 45-56.
L. A. Belady, "A study of replacement algorithms for a virtual-storage computer," IBM Systems journal, vol. 5, No. 2, pp. 78-101,1966.
N. Megiddo et al., "ARC: A self-tuning, low overhead replacement cache," in Proceedings of the 2nd USENIX Conference on File and Storage Technologies, San Francisco, CA, 2003, pp. 115-130.
R. Koller et al., "I/O deduplication: Utilizing content similarity to improve i/o performance," ACM Transactions on Storage (TOS), vol. 6, No. 3, p. 13,2010.
S. Bansal et al., "CAR: Clock with adaptive replacement." in Proceedings of the 2th USENIX Conference on File and Storage Technologies, vol. 4,2004, pp. 187-200.

S. Byan et al., "Mercury: Host-side flash caching for the data center," in IEEE 28th Symposium on Mass Storage Systems and Technologies, Pacific Grove, CA, 2012, pp. 1-12.
T. Kgil et al., "Improving nand flash based disk caches," in Proceedings of the 35th Annual International Symposium on Computer Architecture, Bejing, China, 2008, pp. 327-338.
T. Pritchett et al., "Sievestore: A highly-selective, ensemble-level disk cache for cost-performance," in Proceedings of the 37th annual international symposium on Computer architecture, Saint-Malo, France, 2010, pp. 163-174.
A. Elnably et al., "Efficient qos for multi-tiered storage systems." in HotStorage, 2012.
D. G. Andersen et al., "Rethinking flash in the data center," IEEE micro, vol. 30, No. 4, pp. 52-54, 2010.
D. Gmach et al., "Resource pool management: Reactive versus proactive or let's be friends," Computer Networks, vol. 53, No. 17, pp. 2905-2922, 2009.
D. Lee et al., "LRFU: A spectrum of policies that subsumes the least recently used and least frequently used policies," IEEE Transactions on Computers, vol. 50, No. 12, pp. 1352-1361, 2001.
D. Liu et al., "VFRM: Flash resource manager in vmware esx server," in Network Operations and Management Symposium (NOMS), 2014 IEEE, IEEE, 2014, pp. 1-7.
F. Chen et al., "Hystor: Making the best use of solid state drives in high performance storage systems," in Proceedings of the International Conference on Supercomputing, Tucson, Arizona, 2011, pp. 22-32.
G. Zhang et al., "Adaptive data migration in multi-tiered storage based cloud environment," in Cloud Computing (CLOUD), 2010, IEEE 3rd International Conference on IEEE, 2010, pp. 148-155.
G. Zhang et al., "Automated lookahead data migration in ssd-enabled multi-tiered storage systems," in Mass Storage Systems and Technologies (MSST), 2010 IEEE26th Symposium on. IEEE, 2010, pp. 1-6.
H. Wang et al., "Balancing Fairness and Efficiency in Tiered Storage Systems with Bottleneck-Aware Allocation," in FAST, 2014, pp. 229-242.
Hoseinzadeh et al., "Spcm: The striped phase change memory," ACM Transactions on Architecture and Code Optimization (TACO), vol. 12, No. 4, p. 38, 2016.
I. Newsroom, "Intel and micron produce breakthrough memory technology", Jul. 28, 2015.
J. Ou et al., "Edm: An endurance-aware data migration scheme for load balancing in ssd storage clusters," in Parallel and Distributed Processing Symposium, 2014, IEEE 28th International, IEEE, 2014, pp. 787-796.
J. Rolia et al., "A capacity management service for resource pools," in Proceedings of the 5th international workshop on Software and performance, ACM, 2005, pp. 229-237.
J. Tai et al., "Improving Flash Resource Utilization at Minimal Management Cost in Virtualized Flashbased Storage Systems," Cloud Computing, IEEE Transactions onno. 99, p. 1, 2015.
M. Hoseinzadeh et al., "Reducing access latency of mlc pcms through line striping," ACM SIGARCH Computer Architecture News, vol. 42, No. 3, pp. 277-288, 2014.
M. Wachs et al., "Argon: Performance insulation for shared storage servers." in FAST, vol. 7, 2007, pp. 5-5.
N. Beckmann et al., "Jigsaw: Scalable software-defined caches," in Proceedings of the 22nd international conference on Parallel architectures and compilation techniques, IEEE Press, 2013, pp. 213-224.
R. A. Pletka et al., "Health-binning: Maximizing the performance and the endurance of consumer-level nand flash," in Proceedings of the 9th ACM International on Systems and Storage Conference, ACM, 2016, p. 4.
S. Seltzsam et al., "Autoglobe: An automatic administration concept for service-oriented database applications," in Data Engineering, 2006, ICDE'06, Proceedings of the 2200 International Conference on IEEE, 2006, pp. 90-90.
T. Luo et al., "S-CAVE: Effective ssd caching to improve virtual machine storage performance," in Proceedings of the 22nd international conference on Parallel architectures and compilation techniques, IEEE Press, 2013, pp. 103-112.

(56) References Cited

OTHER PUBLICATIONS

T. N. Theis et al., "The end of Moore's law: A new beginning for information technology," Computing in Science & Engineering, vol. 19, No. 2, pp. 41-50, 2017.

T. Setzer et al., "Virtual machine re-assignment considering migration overhead," in Network Operations and Management Symposium (NOMS), 2012 IEEE, IEEE 2012, pp. 631-634.

Z. Fan et al., "H-ARC: A non-volatile memory based cache policy for solid state drives," in Mass Storage Systems and Technologies (MSST), 2014 30th Symposium on. IEEE, 2014, pp. 1-11.

Z. Yang et al., "GREM: Dynamic SSD Resource Allocation in Virtualized Storage Systems With Helerogeneous IO Workloads," in 35th IEEE International PerformanceComputing and Communications Conference (IPCCC). IEEE, 2016.

Z. Yang et al., "A Fresh Perspective on Total Cost of Ownership Models for Flash Storage," in 2016 IEEE 8th International Conference on Cloud Computing Technology and Science, IEEE, 2016.

Z. Yang et al., "Online Flash Resource Migration, Allocation, Retire and Replacement Manager Based on Multiple Workloads WAF TCO Model," U.S. Appl. No. 15/094,971, 2015.

\* cited by examiner

| Specialization Information | | | |
|---|---|---|---|
| | Throughput (IOPS) | Bandwidth (MBPS) | Storage Size (GB) |
| Tier 1 | 1 | 1 | 0 |
| Tier 2 | 0 | 1 | 0 |
| Tier 3 | 0 | 0 | 1 |
FIG. 11
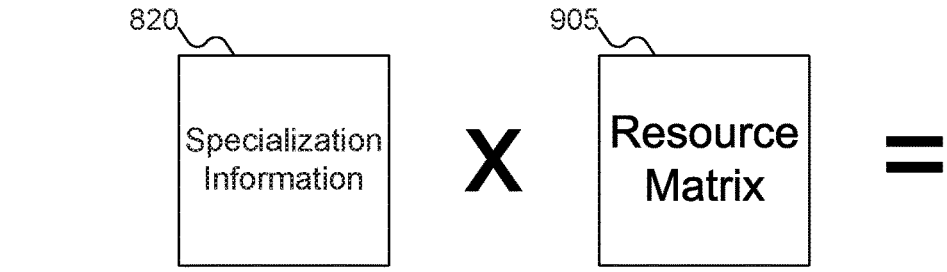
| Current Performance Score Matrix | | | |
|---|---|---|---|
| | Tier 1 | Tier 2 | Tier 3 |
| VM 1 | 0.55 | 0.25 | 0.30 |
| VM 2 | ... | ... | ... |
| VM 3 | ... | ... | ... |
FIG. 12
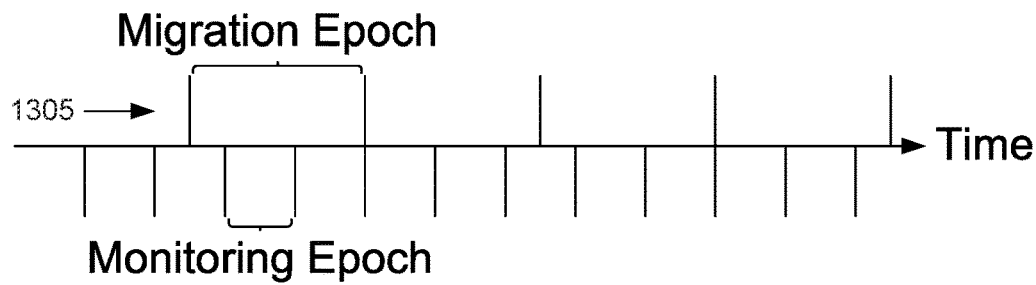
FIG. 13

AUTOMATIC DATA PLACEMENT MANAGER IN MULTI-TIER ALL-FLASH DATACENTER

RELATED APPLICATION DATA

This application claims the benefit of U.S. Provisional Patent Application Ser. No. 62/534,647, filed Jul. 19, 2017, which is incorporated by reference herein for all purposes.

FIELD

The inventive concepts relate generally to data storage, and more particularly to automatically managing in which storage tier virtual machine data is stored.

BACKGROUND

Conventional data storage centers have relied on hard disk drives and other older forms of data storage. Since hard disk drives and other older forms of data storage have relatively high latencies, virtual machines cache frequently accessed data in local storage. Often, the relative benefit of caching data is a tenfold or greater increase in data access times.

But as flash storage becomes more common and more affordable, this differential in access time between the data storage center and the cache is reduced. This reduced benefit of caching means that data is frequently stored exclusively in the data center and not cached at all. When combined with the fact that storing redundant copies (in both the cache and the data center) of data in flash storage is expensive, it becomes more important that the data be stored in the data storage center in the most efficient manner.

In addition, unlike conventional storage devices such as hard disk drives, flash storage may have different specializations. As conventional storage devices do not consider device specializations, any tier choices for data storage using conventional technology is suboptimal.

A need remains for a way to more optimally store data in data storage centers using flash storage that offers both satisfactory access time and utilizes any specializations offered by different storage tiers.

BRIEF DESCRIPTION OF THE DRAWINGS

FIG. 11 shows specialization information about the storage tiers of FIG. 3.

FIG. 12 shows the computation of a score matrix to be used in migrating the virtual machines of FIG. 3 to different storage tiers of FIG. 3.

FIG. 13 shows the relationship between monitoring epochs and migration epochs.

DETAILED DESCRIPTION

Figure 1:
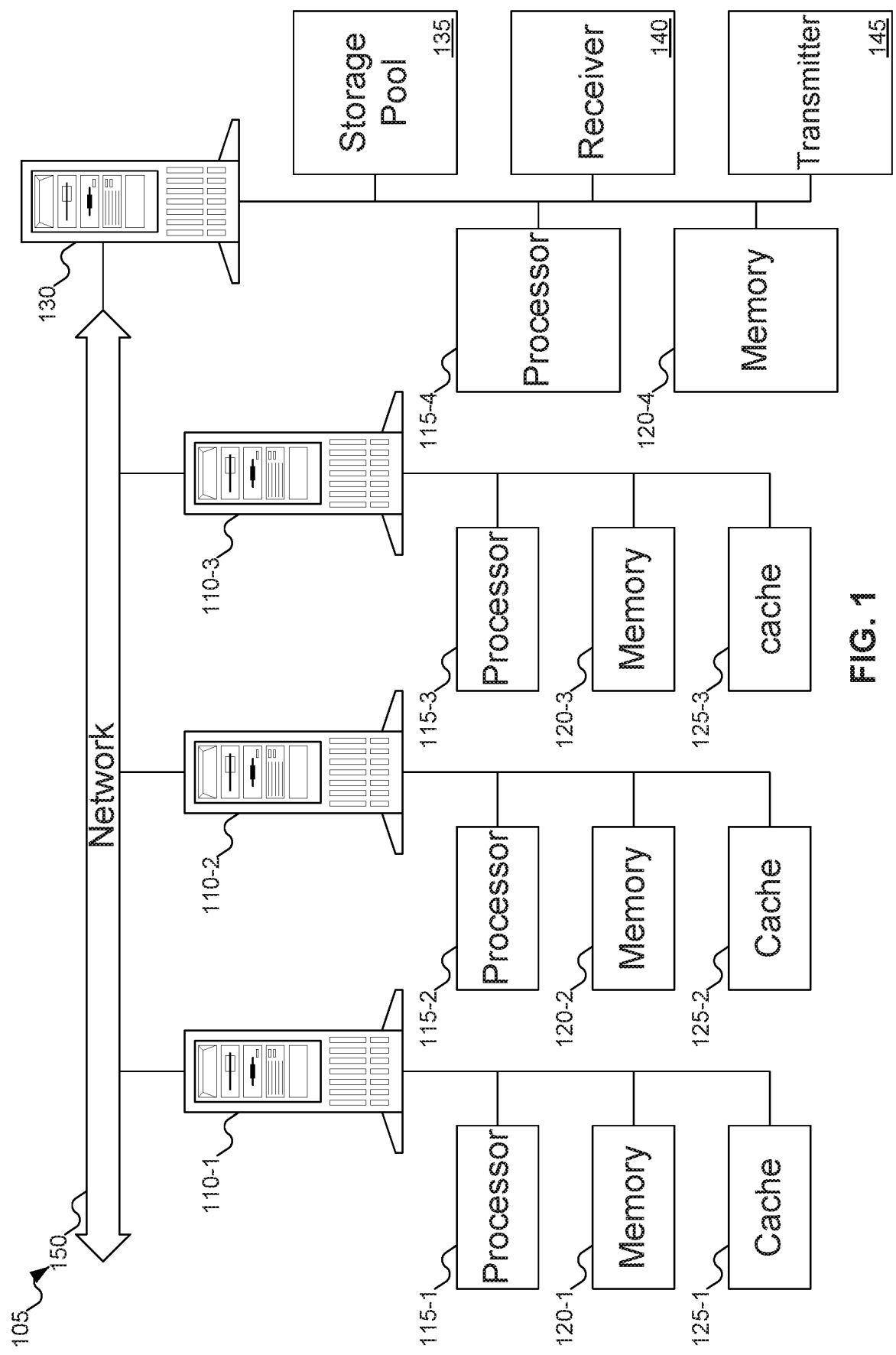
FIG. 1 shows networked machines that may host virtual machines and use a storage pool equipped to perform auto-tiering, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

All-flash storage systems will be adopted in the enterprise data center in the near future thanks to the fact that Solid State Drive (SSD) prices continue to decrease and SSD capacity continues to increase. As a result, the advantages of hard disk drives (HDDs) are fading out, to be replaced with low end SSDs with large capacities, such as Multi-Level Cell (MLC) SSDs. Therefore, a cost-effective design will introduce multi-tier SSDs, with each tier potentially having a unique specialty, such as high speed, large capacity, good at read Input/Output (I/O) commands, long lifetime, etc.

On the other hand, a typical enterprise data center use case uses a hypervisor-virtual machine (VM) structure. The I/O workload patterns of VMs may differ, and the performance improvements they might see from upgrading them to a higher tier of service are not same. Motivated by this, a full solution called "AutoTiering" may handle VM allocation and migration in the all-flash multi-tier data center to best utilize the storage resource, optimize the performance, and reduce the migration overhead. AutoTiering may also consider both historical and predicted performance factors.

VMs run a guest Operating System (OS), such as Linux and Windows, and applications. VMs are isolated from each other. Cloud service vendors "rent" these VMs to users. VMs may have different workload characteristics based on user applications, and thus they may have different level of sensitivities to storage device speeds.

VM hypervisor software, such as Xen, KVM, and VMware, may host multiple virtual machines (VMs) within a single server. VM hypervisor software is responsible for scheduling, resource management, system software Application Programming Interfaces (APIs) and hardware virtualization. Embodiments of the inventive concept may include an AutoTiering daemon installed at the VM hypervisor level, whose job is to communicate with the AutoTiering I/O Filter and the AutoTiering Controller.

All VM servers may be connected to a centralized storage pool to share the backend all-flash multiple-tier SSD disks, which may include devices such as Non-Volatile Memory Express (NVMe) SSDs, 3D XPoint Non-Volatile Memory (NVM) SSDs, and MLC/Triple level Cells (TLC)/Quad Level Cells (QLC) SSDs. Each tier may have a different specialty, such as fast speed, large storage capacity, etc.

AutoTiering may include three components: an AutoTiering I/O Filter, an AutoTiering Daemon, and an AutoTiering Controller.

The AutoTiering I/O Filter driver may be attached to every VM (i.e., Virtual Machine Disk (VMDK) files) being managed. The AutoTiering I/O Filter driver may collect I/O-related statistics as well as running special latency tests on every VMDK. The data may be collected at some sample period rate and the results may be sent to the AutoTiering Daemon on the host system responsible for collecting all data from all the VMDKs.

The AutoTiering Daemons may run on the VM hypervisor of all physical machines. The AutoTiering Daemons track the workload change (I/O access pattern change) of the VM server, and collects the results of injected latencies tests from the AutoTiering I/O Filter to send to the AutoTiering Controller.

The AutoTiering Controller may run on a dedicated server or the embedded system in the storage system. The AutoTiering Controller may make decisions to trigger migration based on the predicted VM performance if the VM is migrated to another tier as well its corresponding migration overhead.

From each VM point of view, the reason for a certain VM to be migrated from one tier to the other is that the VM might perform better (less average I/O latency, higher I/O Operations Per Second (IOPS), higher throughput, etc.) after migration. But at the same time, there is a corresponding migration cost, since it is relatively expensive to migrate a VM from one tier to another and is not ignorable.

From the global optimization point of view, it is hard to satisfy all VMs requests to be migrated to their favorite tiers at the same time, due to resource constraints and their corresponding Service Level Agreements (SLAs). The global optimization should consider changes of VMs over time as well as previous migration effects. For example, the current best allocation solution may lead to a bad situation in the future due to changing VM behaviors during runtime. Thus, a global optimization should consider the potential benefits and penalties, migration overhead, historical and predicted performance of VMs on each tier, SLA (service level agreement), etc. Based on this information, AutoTiering may attempt to reach an optimized solution for multi-tier all-flash storage systems using Eq. 1-6.

TABLE 1

Notations.

| Notation | Meaning |
| --- | --- |
| $v$ | VM id, $v \in [1, v_{max}]$, where $v_{max}$ is the last VM. |
| $t$ | Tier id, $t \in [1, t_{max}]$, where $t_{max}$ is the last tier. |
| $t_{v, \tau}$ | VM v's hosting tier during epoch $\tau$. |
| $k$ | Different types of resources, $t \in [1, k_{max}]$, such as IOPS, throughput, storage size, etc. |
| $\tau$ | Temporal epoch id, where $\tau \in [0, +\infty)$. |
| $\alpha_k$ | Weight of resource k. |
| $\beta$ | Weight of migration cost. |
| $r(v, t_{v, \tau}, \tau, k)$ | Predicted type of k resource usage of VM v running on tier $t_{v, \tau}$. |
| $m(v, t_{v, \tau-1}, t_{v,\tau})$ | Migration cost of VM v during epoch $\tau$ from tier $t_{v, \tau-1}$ to tier $t_{v, \tau}$. |
| $k_{stg}$ | Storage size. |
| $Pr(v, t, \tau)$, $Pw(v, t, \tau)$ | Throughput of read or write commands of VM v on tier t during epoch $\tau$. |
| $Pr(\Lambda, t, \tau)$, $Pw(\Lambda, t, \tau)$ | All remaining available read or write throughput of tier t during epoch $\tau$. |
| $W_{v, \tau}$ | Weight of VM v. |
| $\Gamma_k$ | Upper bound (in percentage) of each type of resource that may be used. |
| $R(t_{v, \tau}, k)$ | Total capacity of k-th type of resource on tier $t_{v, \tau}$ |

Minimize $$\sum_{\forall v, \forall t, \forall \tau} w_{v,\tau} \cdot \left[ \sum_{\forall k} \alpha_k \cdot r(v, t_{v,\tau}, \tau, k) - \beta \cdot m(c, t_{v,\tau-1}, t_{v,\tau}) \right] \quad (1)$$

Subject to:

$$r(v, t_{v,\tau}, \tau, k) = r_{Prd}(v, t_{v,\tau-1}, t_{v,\tau}, \tau-1, k) \geq 0, \forall v, \forall t, \forall \tau \quad (2)$$

$$r(v, t_{v,\tau_1}, \tau_1, k_s) \equiv r(v, t_{v,\tau_2}, \tau_2, k_s) \geq 0, \forall \tau_1, \tau_2 \in [0, +\infty) \quad (3)$$

$$m(v, t_{v,\tau-1}, t_{v,\tau}) = \frac{r(v, t_{v,\tau-1}, \tau-1, k_s)}{\min(Pr(\Lambda, t_{v,\tau-1}, \tau-1) + Pr(v, t_{v,\tau-1}, \tau-1),} \quad (4)$$
$$Pw(\Lambda, t_{v,\tau-1}, \tau-1))$$

$$t_{v,\tau} \neq \emptyset, \forall v, \forall \tau \quad (5)$$

$$\sum_{\forall v} r(v, t_{v,\tau}, \tau, k) \leq \Gamma_k \cdot R(t_{v,\tau}, k), \forall t, \forall k, \forall \tau \quad (6)$$

Eq. 1 shows the objective function. The main idea is to maximize the entire performance gain minus migration cost: "Performance Gain–Performance Penalty". The inner "sum" operator conducts a weighted sum of the usage of all types of resources (such as TOPS, throughput, and storage size, etc.) of each VM, assuming migrating v from tier $t_{\tau-1}$ to $t_\tau$. Notice that migration here does not migrate a VM from one host server to another: only the backend VMDK files are migrated from one SSD tier to the other. Thus, non-disk-I/O related resources such as CPU, memory, etc. do not need to be considered. The outside "sum" operator further iterates all possible migration cases. Notice that the weight parameter $W_{v,\tau}$ may reflect the SLA of each VM.

Eq. 2 shows that a prediction model function may be utilized to predict the performance gain. Eq. 3 ensures that storage size (i.e., VMDK size) will not change before and after each migration. Eq. 4 estimates the temporal migration overhead. In detail, the temporal migration overhead is the size of VM to be migrated divided by the bottleneck imposed by reading and writing the data on the respective tiers. In detail, $Pr(\Lambda, t_{v,\tau-1}, \tau-1)$ represents the available remaining speed, and since the VM may be paused during migration, the throughput used by this VM is also available (i.e., $Pr(\Lambda, t_{v,\tau-1}, \tau-1)$ may be added back). $Pw(\Lambda, t_{v,\tau-1}, \tau-1)$ represents the migrate-in write speed. Eq. 5 reflects the need to guarantee that a VM is hosted by one and only one disk tier. Finally, Eq. 6 shows the resource constraints, where $\Gamma_k$ is a preset upper bound (in percentage) of each type of resource that may be used.

It is hard to conduct global optimization for all epochs during runtime due to the following challenges:

1) The system has almost no information about the future workload patterns, so it is hard to conduct global optimization for all $\tau$ time periods during runtime.

2) When performing global optimization, the decisions for each epoch are not independent, which means that traditional sub-optimal-based dynamical programming techniques may not be used to solve the problem by optimizing each epoch's objective function value of "Performance Gain−Performance Penalty".

3) Depending on the complexity of the performance prediction model (which predicts a VM's performance on other tiers without migration), the optimization problem may easily become NP-hard.

Therefore, to solve this problem in acceptable time, some constraints need to be relaxed.

Instead of attempting to perform global optimizing for all time, a solution may be sought to only optimize for each epoch (i.e., runtime greedy).

The problem then is similar to a weighted knapsack problem. Furthermore, since each tier's performance "specialty" (such as high TOPS, high throughput, large space, small Write Amplification Factor (WAF) function, large over-provisioning, and large program/erase (P/E) cycles, etc.) are known in advance, a "score" may be calculated for each VM's estimated performance focusing on a specialty resource dimension (for example, TOPS and throughput for tier 1), and make migration decisions based on the performance-specialty score ranking, together with corresponding estimation of migration overhead.

Two different epochs may be scheduled: a monitoring epoch, representing the frequency for evaluating the performance, and regresses the performance estimation model, which may be set to any desired interval: for example 15 minutes; and a migration epoch, representing the frequency with which VM migration from one tier to the other may be performed, which may be set to any desired interval: for example, 1 day or 1 week. The monitoring epoch and the migration epoch are not necessarily fixed: they may be determined using functions to be able to adaptively adjust their sizes during runtime. Nor does the migration epoch need to be an integer multiple of the monitoring epoch. The smaller these window sizes are, the more frequently the storage system is monitored and measured and VMs are migrated. System administrators may balance the tradeoff between accuracy and migration cost by conducting sensitivity analysis before deployment.

In order to estimate VM's performance on other tiers without migration, a VM's performance on another tier may be "emulated" by manually injecting additional latencies to each VM's I/O commands and measuring the resultant effect on total I/O latency by calling AutoTiering I/O Filter APIs (e.g., VMware vSphere APIs for I/O Filtering).

The change in performance of a VM in different tiers may be modeled using a linear curve. The graph of Average I/O Latency vs Injected Latency may be regressed into a linear equation. The slope of the line may be dependent on how synchronous or asynchronous the application is that is running at the time. Synchronous and asynchronous applications differ in how they operate, which is reflected in the slopes of the lines. Specifically, when synchronous applications send I/O commands, the synchronous applications wait for the I/O commands to complete, which blocks the progress of an application while the communication is in progress, and leaves system resources idle. In contrast, asynchronous applications may send I/O commands and may perform other processing before the transmission has finished. These facts mean that asynchronous applications tend to be less affected by the latency of I/O commands, but that improvement comes at a cost: the asynchronous applications do not know when the response will be sent, and have to be able to receive the response at any time.

VM sensitivities to tier speed differ. A VM with synchronous applications is more sensitive to tier speed change than a VM with asynchronous applications. The main reason is that asynchronous applications usually have less frequent I/O commands to flush, and a lesser reliance on I/O timing.

Motivated by these observations, a "tier speed sensitivity calibration session" (TSSCS) may be used to predict how much a VM might gain (or be penalized) by migrating the VM to a higher (or lower) speed tier without real migrating. In detail, TSSCS has the following properties:

1) Light-weight: Running on the AutoTiering I/O Filter, TSSCS injects some latencies into I/O commands for each VM, and takes a very short time in order not to impact current hosting workloads.

2) Multiple samples per latency per TSSCS: To improve the emulation accuracy for each VM's performance under each tier, the results obtained with the same injected latency of each tier may be averaged.

3) Multiple latencies per TSSCS: To refine the regression, multiple different latencies may be injected. Moreover, the injected latencies do not have to be limited to the available tiers in the current storage pool. Instead, additional latency data points may be used to improve the regression accuracy.

4) Multiple TSSCS during runtime: The TSSCS may be triggered periodically to update the curve and regression function.

Based on the corresponding performance, the correlation between performance gain vs. tier speed may be determined by linear regression, which reflects the sensitivity of each VM to the disk speed improvement or decline. It is possible for the curve to be regressed into a polynomial or non-linear function, but changing the regression does not affect how AutoTiering operates. Given the injected latency curves for each VM at the current moment, the IOPS, throughput, storage size, etc. for each VM at each tier may be calculated. Notice that while TOPS, throughput, and storage size are the focus, other type of resources may also be considered.

Table 2 summarize notations used in this subsection, and Table 3 further shows the result of estimated average I/O latencies for an example using three VMs under three different tiers.

TABLE 2

Notations.

| Notation | Meaning |
|---|---|
| $L_t$ | Original average I/O latency (without injected latency) of tier t. |
| $b_v, m_v$ | Two parameters for VM x's regressed tier speed sensitivity correlation model, i.e., y = mx + b, where y is the average I/O latency and x is the injected latency. |
| $s_v$ | Average I/O size of VM v. |
| $S_v$, VM[v].size | Storage size of VM v. |
| maxIOPS[t], maxMBPS[t], maxSize[t] | Preset available resource caps of tier t, where we set it to be 90% of the total capacity of each type of resource. |

TABLE 3

Example of estimate average I/O latencies without migration.

| | Tier 1 | Tier 2 | Tier 3 |
|---|---|---|---|
| V1 Avg I/O Latency (μs) | $b_1$ | $m_1(L_2 - L_1) + b_1$ | $m_1(L_3 - L_1) + b_1$ |
| V2 Avg I/O Latency (μs) | $m_2(L_1 - L_2) + b_2$ | $b_2$ | $m_2(L_3 - L_2) + b_2$ |
| V3 Avg I/O Latency (μs) | $m_3(L_1 - L_3) + b_3$ | $m_3(L_2 - L_3) + b_3$ | $b_3$ |

Tier speed sensitivity calibration session (TSSCS) may iterate for each VM and each tier in the storage system. It may calculate the coefficient variation (i.e., CV) of I/O latencies from samples for each injected latency. It may then calculate the average value of I/O latency for each injected latency. It may then average the CV value of all injected latencies, and based on the result, AutoTiering may define the confidence in the injected latencies used to generate the linear regression for each VM, and therefore the confidence in then linear regression itself. The lower the CV is, the higher the confidence this VM has. If the CV is larger than 1, the confidence may be set to a lower bound that may be adjusted based on the system administrator's requirement: for example, 0.05. Finally, TSSCS may call the regression function to calculate corresponding m and b values. Notice that while embodiments of the inventive concept may use a linear regression model with only two parameters in the returned tuple, the system administrator may add more items into the returned tuple based on their chosen regression model.

AutoTiering has three two-dimensional matrices to record three types of resources, such as IOPS (I/O commands per second), throughput (megabytes per second, or MBPS), and storage size (bytes). Additional matrices for any other types of resources in the storage system may be added as desired. In contrast with TOPS and throughput, the matrix for storage size is relatively straightforward to obtain by calling the hypervisor APIs to measure the storage size of each VM is occupying.

AutoTiering may estimate TOPS using the linear estimation based on regressed M and B values. Once the estimated average I/O latency results to calculate corresponding TOPS and throughput of each VM on different tiers are obtained, TOPS and throughput may be calculated using the following equations:

$$IOPS = \frac{avgIOSize(v) \times 10^6}{avgIOLatency(v, t)} \quad (7)$$

$$\text{Throughput} = avgIOsize \times IOPS \quad (8)$$

Since different types of resource have different units, it would be difficult to put them together in a single multi-dimensional matrix. Therefore, each resource may be converted into a percentage of the total available resource capacity of each tier. An example of such a normalization is shown in Table 5.

TABLE 5

Example of normalized performance matrix of 3 VMs if they are running tier 1.

| | IOPS | Throughput | Storage |
|---|---|---|---|
| VM1 | $\dfrac{10^6}{b_1 \times \text{maxIOPS}[t]}$ | $\dfrac{s_1 \times 10^6}{b_1 \times \text{maxMBPS}[t]}$ | $\dfrac{S_1}{\text{maxSize}[t]}$ |
| VM2 | $\dfrac{10^6}{[m_2(L_1 - L_2) + b_2] \times \text{maxIOPS}[t]}$ | $\dfrac{s_2 \times 10^6}{[m_2(L_1 - L_2) + b_2] \times \text{maxMBPS}[t]}$ | $\dfrac{S_2}{\text{maxSize}[t]}$ |
| VM3 | $\dfrac{10^6}{[m_3(L_1 - L_3) + b_3] \times \text{maxIOPS}[t]}$ | $\dfrac{s_3 \times 10^6}{[m_3(L_1 - L_3) + b_3] \times \text{maxMBPS}[t]}$ | $\dfrac{S_3}{\text{maxSize}[t]}$ |

The calculated score should reflect the following facts:
1) Characteristics of both tier and VM: the score should reflect each tier's specialty and each VM's workload characteristics if running on each tier. Thus, each VM's score on each tier is calculated separately.
2) SLA weights: VMs are not equal since they have different SLA weights, as shown in Eq. 1.
3) Confidence of estimation: the coefficient variation calculated in performance matrices may be used to reflect the confidence of estimation.
4) History and migration cost: a convolutional aging factor may be used to include history scores into the score calculation. Migration cost may also be estimated and included in the score calculation.

Based on user configuration or default configuration, the resources offered by each tier are known in advance. AutoTiering may optimize on any number of resources for a given tier. To reflect the specialty, a tier specialty matrix may be used. An example tier specialty matrix is shown in Table 6. In Table 6, an all-or-nothing granularity for specialty configuration is used. A cell with 1 means the current tier has a speciality in that the corresponding type of resource. Otherwise, the tier is not optimized for that type of resource. But in other embodiments of the inventive concept, the values in this matrix may not necessarily be 0 and 1. System administrators may set any weight instead 0 and 1 if they want a more fine-grained granularity to control specialty. System administrators may also extend this matrix by adding more type of resources (i.e., more rows).

TABLE 6

Example of tier specialty matrix.

|  | IOPS | Throughput (MBPS) | Storage Size (bytes) |
|---|---|---|---|
| Tier 1 | 1 | 1 | 0 |
| Tier 2 | 0 | 1 | 0 |
| Tier 3 | 0 | 0 | 1 |

It is helpful if the tiers are sorted by order of most-to-least-expensive-tier by default, and this order is regarded as a priority order during migration decision making period. Notice that system administrators may also change this order based on their preference of each tier.

The next question is "how to reflect each VM's performance on each tier while reflecting each tier's specialty?". Since the term "performance" considers multiple dimensions or types of resource (such as TOPS, throughput, and storage size), a weighted sum is used to reflect each tier's specialty/specialties. An "orthogonal match", which is a per-VM-per-tier multiplication operation of "specialty" matrix and VM capacity utilization rate matrix, may be used, as shown in Eq. 9:

$$\begin{bmatrix} VMCapRateMat[t][v].IOPS \\ VMcapRateMat[t][v].MBPS \\ VMCapRateMat[t][v].size \end{bmatrix} \times \quad (9)$$

$$[specialty[t].IOPS, specialty[t].MBPS, specialty[t].size]$$

Additionally, AutoTiering also allows system administrators to configuration different weights for each type of resource.

An example of calculating a capacity score for tier 1 is shown in Table 7. Tuples of (IOPS %, MBPS %, size %) in the first row ("capacityRate") are estimated VM utilization rates of each type of resource on this tier. In this example, none of these values is greater than 1, so all three pass the constraint test. Finally, assume the specialty matrix is as shown in Table 6.

TABLE 7

Example of capacity rate, constraint, and capacity score values of 3 VMs if they are running on tier 1.

|  | VM1 | VM2 | VM3 |
|---|---|---|---|
| capacityRate | (0.5, 0.6, 0.3) | (0.2, 0.3, 0.3) | (0.1, 0.5, 0.4) |
| capacityConstraint | Pass | Pass | Pass |
| currCapScore | (0.5 + 0.6)/2 = 0.55 | (0.2 + 0.3)/2 = 0.25 | (0.1 + 0.5)/2 = 0.30 |

The final score is a convolutional sum of the historical score, the current score, and the migration cost, as shown in Eq. 10:

$$totalScore = agingFactor \times historicalScore + currCapacityScore - weightMig \times migrationCost \quad (10)$$

This final score has three components:

1) historicalScore: to avoid the case that some VMs are frequently migrated and handed over between two tiers due to making decision only based on recent epochs, which may contain I/O spikes or bursts, AutoTiering considers historicalScore, with a preset agingFactor to fadeout old scores. Initially, any VM that is not currently assigned to the specific tier will receive a zero score.

2) currCapScore: the current capacity score is calculated as described above with reference to Eq. (9) and Table 7. Again, any VM that is not currently assigned to the specific tier will receive a zero score.

3) migrationCost: AutoTiering calculates the bottleneck of migration speed by selecting the smaller value of migrate-out and migrate-in available throughputs. AutoTiering returns a result of the size of the VM divided by the migration speed as the migration temporal cost.

To calculate the score, for each tier, AutoTiering may iterate its hosting VMs and check whether the current VM exceeds the upper bounds of any types of resources of the current tier t. If the VM exceeds any resource capacity upper bound, then the corresponding VM capacity utilization rate may be set to 0, and the score of this VM v on the tier t is set to −1. Otherwise, resource usage is converted to percent capacities. The total score is then calculated as above. Notice that AutoTiering also allows the system administrators to control weights and for each type of resource by adjusting the various weight values for the resources.

AutoTiering conducts migration in the "long-term of view". That is, AutoTiering follows a relatively low frequency for migration, since migration operations are relatively expensive.

AutoTiering may check whether a migration operation is needed and may trigger the corresponding migration if necessary. AutoTiering may iterate over each tier, preferably in the order of most-to-least-expensive-tier. Notice that system administrator may change this order based on their preference of each tier. AutoTiering then sorts the tier scores in descending order. For each VM in this sorted list, AutoTiering may skip the VM if:

1) the current iterated VM has already been assigned (migrated) this time, or 2) there is no score for this VM on this tier because it exceeds the capacity limitation of this tier, or 3) there is not enough resource capacity left on the tier t for this VM v during assignment.

Otherwise, AutoTiering may assign VMs from the most to least score one by one to this tier. Notice that if the VM is already on its target tier, this assignment does not move the VM. Once a VM is assigned to another tier, the VM may be flagged for migration, which involves copying the data (VMDK files) from the source storage tier to the destination storage tier.

The conventional data center stores data using HDDs. HDDs are typically fairly similar to each other in most senses, differing primarily in their cost per gigabyte, their read/write speed, and their overall capacity. As might be expected, the larger the capacity or the faster the read/write speed, the most expensive the HDD. But even considering these differences, HDDs have an average cost of $0.25/gigabyte, and have an average read/write speed of 10 milliseconds (ms). But even 10 ms may be a long time to wait in computer operations, generally resulting in some data being cached locally to improve access time.

On the other hand, SSDs may offer different specializations. Some SSDs may have low read/write latency, others may have high bandwidth, still others may have large capacity, and still others may have low write amplification factors. In this document, the term "resource" is used to describe these specializations that individual storage devices might offer to a greater or lesser extent. Still other SSDs may offer combinations of these resources. These additional specializations offer benefits to applications that may take advantage of these resources, but complicate the process of determining which SSD is best for a particular application.

In contrast to HDDs, SSDs are generally more expensive, with price per gigabyte ranging from $0.28 to $4.68, depending on the format. But SSDs are also generally much more responsive: read/write times may vary from 1-2 ms to microseconds (µs) or even nanoseconds (ns), depending on the SSD format being used.

While the added resources offered by SSDs over HDDs are important factors in how best to assign applications to SSDs, it is the access time that most greatly affects how applications might be assigned to SSDs. Conventional caching algorithms assume a fairly large improvement in performance between storage layers: typically, a 10× improvement in performance is expected from a local cache layer relative to HDD storage. In addition, given that SSDs are more costly per gigabyte to store data than HDDs, caching data would result in data being stored twice, at some cost. Thus, conventional tiering and caching algorithms produce suboptimal results when using storage devices other than HDDs.

FIG. 1 shows networked machines that may host virtual machines and use a storage pool equipped to perform auto-tiering, according to an embodiment of the inventive concept. In FIG. 1, system 105 is shown. System 105 may include virtual machine servers 110-1, 110-2, and 110-3. While FIG. 1 shows three servers, embodiments of the inventive concept may support any number of virtual machine servers.

Each of virtual machine servers 110-1, 110-2, and 110-3 may include processors 115-1, 115-2, and 115-3, respectively, and memories 120-1, 120-2, and 120-3, respectively. Among other uses, processors 115-1, 115-2, and 115-3 may execute applications, such as applications being used by virtual machines running on virtual machine servers 110-1, 110-2, and 110-3, and which may be stored in memories 120-1, 120-2, and 120-3. Processors 115-1, 115-2, and 115-3 may be any varieties of processor: for example, an Intel Xeon, Celeron, Itanium, or Atom processor, an AMD Opteron processor, an ARM processor, etc. While FIG. 1 shows a single processor in each of virtual machine servers 110-1, 110-2, and 110-3, virtual machine servers 110-1, 110-2, and 110-3 may each include any number of processors, each of which may be single core or multi-core processors, and may be mixed in any desired combination. Memories 120-1, 120-2, and 120-3 may each be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memories 120-1, 120-2, and 120-3 may each also be any desired combination of different memory types. Memories 120-1, 120-2, and 120-3 may be controlled by a memory controller (not shown in FIG. 1), also part of virtual machine servers 110-1, 110-2, and 110-3.

Virtual machine servers 110-1, 110-2, and 110-3 may each also include local storage devices. For example, virtual machine servers 110-1, 110-2, and 110-3 may include caches 125-1, 125-2, and 125-3, respectively. Local storage devices such as caches 125-1, 125-2, and 125-3 may take any desired form, such as Hard Disk Drives (HDDs) or Solid State Drives (SSDs), and may use any desired connector, such as Peripheral Component Interconnect (PCI), PCI Express (PCIe), Serial AT Attachment (SATA), Non-Volatile Memory Express (NVMe), NVMe over Fabric (NVMeoF), M.2, or any other desired connection. In some embodiments of the inventive concept, virtual machine servers 110-1, 110-2, and 110-3 may omit caches 125-1, 125-2, and 125-3, relying solely on storage in a data center. In embodiments of the inventive concept that include caches 125-1, 125-2, and 125-3, embodiments of the inventive concept may be combined with embodiments of the inventive concept disclosed in U.S. patent application Ser. No. 15/891,350, filed Feb. 7, 2018, which claims the priority from U.S. Patent Application Ser. No. 62/592,355, filed Nov. 29, 2017, both of which are incorporated by reference herein for all purposes.

System 105 may also include data center server 130. Like virtual machine servers 110-1, 110-2, and 110-3, data center server 130 may include processor 115-4 and memory 120-4. But data center server 130 may also include storage pool 135, receiver 140, and transmitter 145. Storage pool 135 may be a pool of storage devices organized into storage tiers. In some embodiments of the inventive concept, storage pool 135 may include only SSD or other flash memory devices; in other embodiments of the inventive concept, storage pool 135 may include storage devices using other storage formats. Receiver 140 may receive Input/Output (I/O) commands and other data from virtual machine servers 110-1, 110-2, and 110-3, and transmitter 145 may transmit data to virtual machine servers 110-1, 110-2, and 110-3.

Virtual machine servers 110-1, 110-2, and 110-3, and data center server 130, are shown connected via network 150. Using network 150, virtual machine servers 110-1, 110-2, and 110-3 may send I/O commands to data center server 130, and may receive responses therefrom. Virtual machine servers 110-1, 110-2, and 110-3 and data center server 130 may all be part of a Local Area Network (LAN), or may include other network types, such as a Wide Area Network (WAN), or a global network such as the Internet. Network 150 may also be a combination of multiple such networks, in any desired combination.

Although FIG. 1 depicts virtual machine servers 110-1, 110-2, and 110-3 and data center server 130 as servers (and could each be either standalone or rack servers), embodiments of the inventive concept may include virtual machine servers 110-1, 110-2, and 110-3 and data center server 130 each of any desired type without limitation. For example, the servers shown in FIG. 1 could each be replaced with desktop or laptop computers or any other device that may benefit from embodiments of the inventive concept. Virtual machine servers 110-1, 110-2, and 110-3 and data center server 130 may each also include specialized portable computing devices, tablet computers, smartphones, and other computing devices. For purposes of description, Virtual machine servers 110-1, 110-2, and 110-3 are described as hosting virtual machines, but embodiments of the inventive concept may include machines that are not virtual machines running on virtual machine servers 110-1, 110-2, and 110-3.

Figure 2:
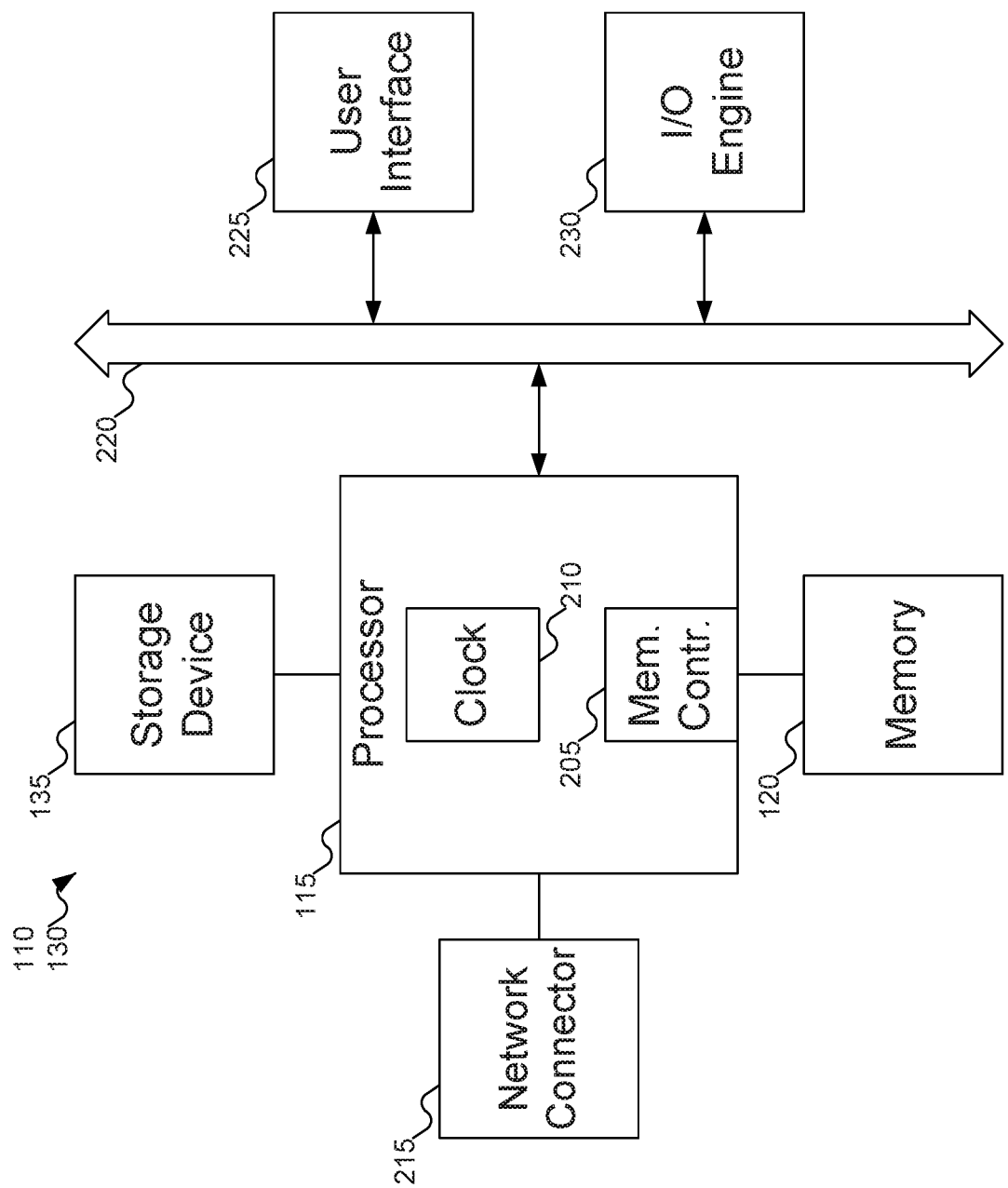
FIG. 2 shows additional details of the machines of FIG. 1.

FIG. 2 shows additional details of servers 110-1, 110-2, 110-3, and 130 of FIG. 1. In FIG. 2, typically, server 110 (which may represent either of servers 110-1, 105-2, or 110-3 of FIG. 1) and server 130 include one or more processors 115, which may include memory controllers 205 and clocks 210, which may be used to coordinate the operations of the components of servers 110 and 130. Processors 115 may also be coupled to memories 120, which may include random access memory (RAM), read-only memory (ROM), or other state preserving media, as examples. In server 130, processor 115 may also be coupled to storage devices 135 (server 110 may also include locally attached storage devices, but such is not required). In servers 110 and 130, processors 115 may also be coupled to network connectors 215, which may be, for example, an Ethernet connector or a wireless connector. Processors 115 may also be connected to buses 220, to which may be attached user interfaces 225 and Input/Output interface ports that may be managed using Input/Output engines 230, among other components.

Figure 3:
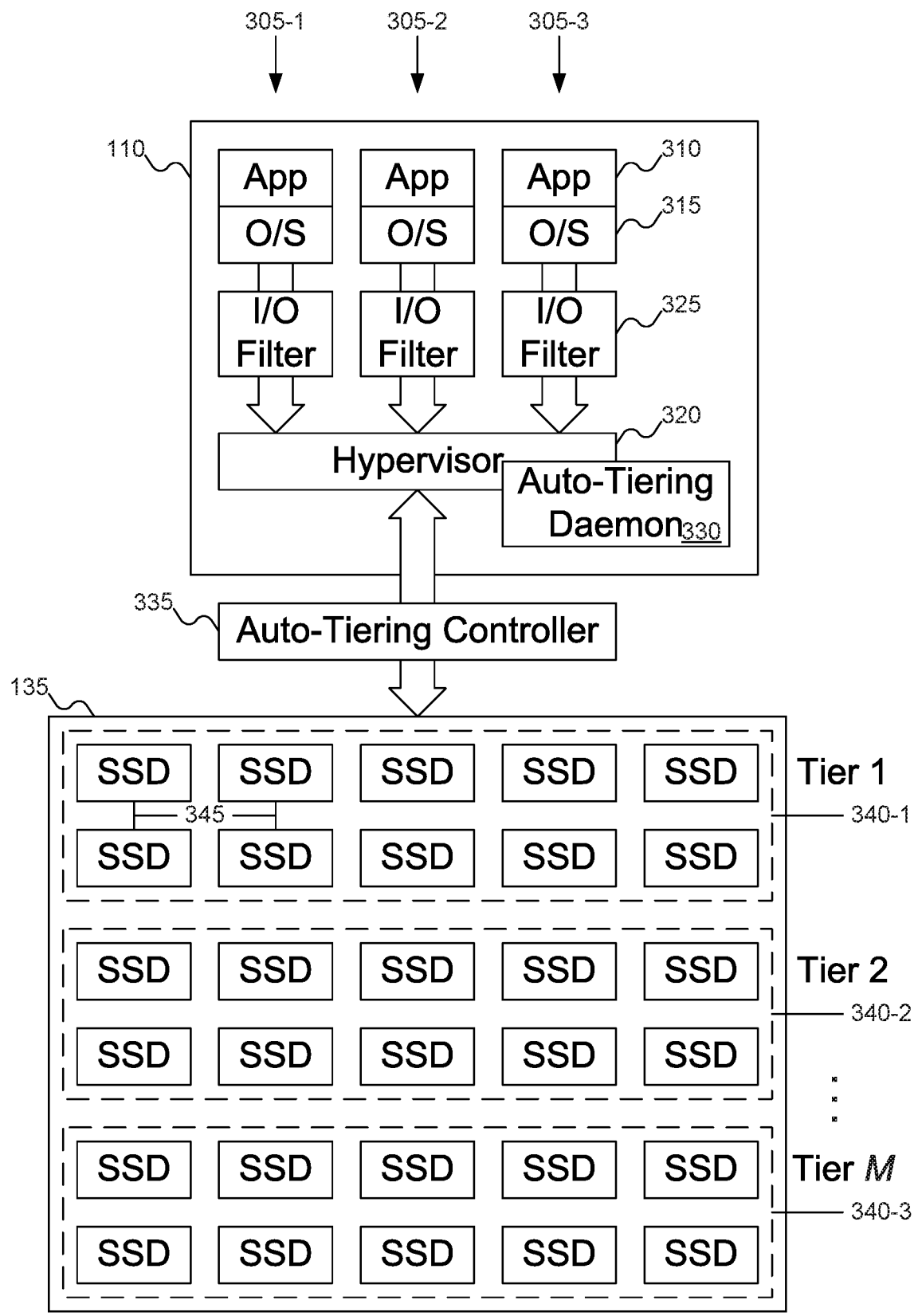
FIG. 3 shows added detail of one server of FIG. 1 interacting with the storage pool of FIG. 1 with auto-tiering, according to an embodiment of the inventive concept.

FIG. 3 shows added detail of virtual machine server 110 of FIG. 1 interacting with storage pool 135 of FIG. 1 with auto-tiering, according to an embodiment of the inventive concept. In FIG. 3, virtual machine server 110 is shown as hosting three virtual machines 305-1, 305-2, and 305-3, but embodiments of the inventive concept may include any number of virtual machines being hosted by virtual machine server 110. While only virtual machine 305-3 is described in greater detail below, embodiments of the inventive concept include other virtual machines, such as virtual machines 305-1 and 305-2, operating similarly. Virtual machine 305-3 is shown as including application 310 running on operating system 315. Hypervisor 320 may manage the operations virtual machines 305-1, 305-2, and 305-3 running on virtual machine server 110.

I/O filter 325 may act as a pass-through filter, receiving commands from application 310 and sending them to hypervisor 320 for execution. I/O filter 325 may be any desired I/O filter, such as the VMware vSphere APIs for I/O Filtering. But in addition to its normal operations, I/O filter 325 may inject latency into some I/O commands coming from virtual machine 305-3, which may provide information about how to estimate VM performance when supported by other storage tiers. The operation of I/O filter 325 is discussed further with reference to FIG. 7 below.

Auto-Tiering Daemon 330 may receive the performance data from I/O filter 325 and forward it to Auto-Tiering Controller 335. Auto-Tiering Daemon 330 may be part of hypervisor 320, or it may be a separate component. In addition, while Auto-Tiering Daemon 330 might just be a simple pass-through device, receiving data from I/O filter 325 and forwarding it to Auto-Tiering Controller 335, Auto-Tiering Daemon 330 may include some of the functionality later attributed to Auto-Tiering Controller 335, such as the operation to perform a linear regression on performance data about virtual machines 305-1, 305-2, and 305-3. And in some embodiments of the inventive concept, Auto-Tiering Daemon 330 may be omitted entirely, with I/O filter 325 communicating directly with Auto-Tiering Controller 335 rather than permitting Auto-Tiering Daemon 330 to collect and forward performance data.

Auto-Tiering Controller 335 is responsible for taking the performance data received from Auto-Tiering Daemon 330 and using that data to estimate how virtual machine 305-3 would perform in each storage tier, after which Auto-Tiering Controller 335 may migrate data for virtual machine 305-3 to another storage tier as appropriate. Storage pool 135, which is managed by Auto-Tiering Controller 335, may include any number of storage tiers: FIG. 3 shows three tiers 340-1, 340-2, and 340-3. Within each tier, there may be any number of storage devices 345.

As mentioned above, each storage tier may offer specializations that take advantage of specific resources offered by that storage tier. For example, storage tier 340-1 might offer fast read/write times, whereas storage tier 340-3 might offer low write amplification factors. For storage tiers 340-1, 340-2, and 340-3 to offer specializations, storage devices 345 within the storage tier should all offer the specialization. Thus, in some embodiments of the inventive concept, storage devices 345 within a given storage tier are relatively or completely homogeneous with respect one or more specialties: in some cases, storage devices 345 within a given storage tier all storage devices 345 should be the same model of storage device.

In some embodiments of the inventive concept, Auto-Tiering Controller 335 is implemented as part of data center server 130 of FIG. 1. In other embodiments of the inventive concept, Auto-Tiering controller may be implemented as a virtual machine, possibly running on one of virtual machine servers 110-1, 110-2, and 110-3.

Figure 4:
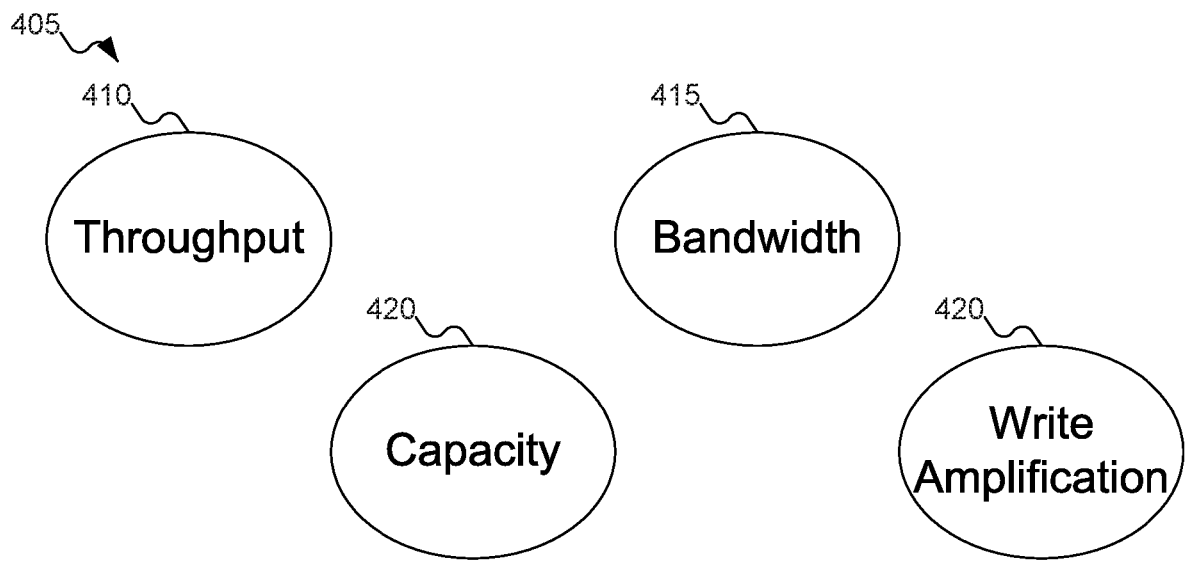
FIG. 4 shows different resources available offered by different storage devices.

FIG. 4 shows different resources available offered by different storage devices. In FIG. 4, resources 405 are shown. Resource 405 may include throughput 410, which represents the number of I/O commands that may be performed in a given amount of time, such as one second (usually described as I/O Operations Per Second, or IOPS), bandwidth 415, which reflects how much data may be transmitted in a given unit of time (usually described in terms of megabytes per second, or MBPS), capacity 420, which reflects how much data may be stored, and write amplification factor 425, which reflect how much additional data is written as a result of garbage collection operations. Resources 405 may easily be expanded to include any other desired resources offered by storage devices storage pool 135 of FIG. 1.

Figure 5:
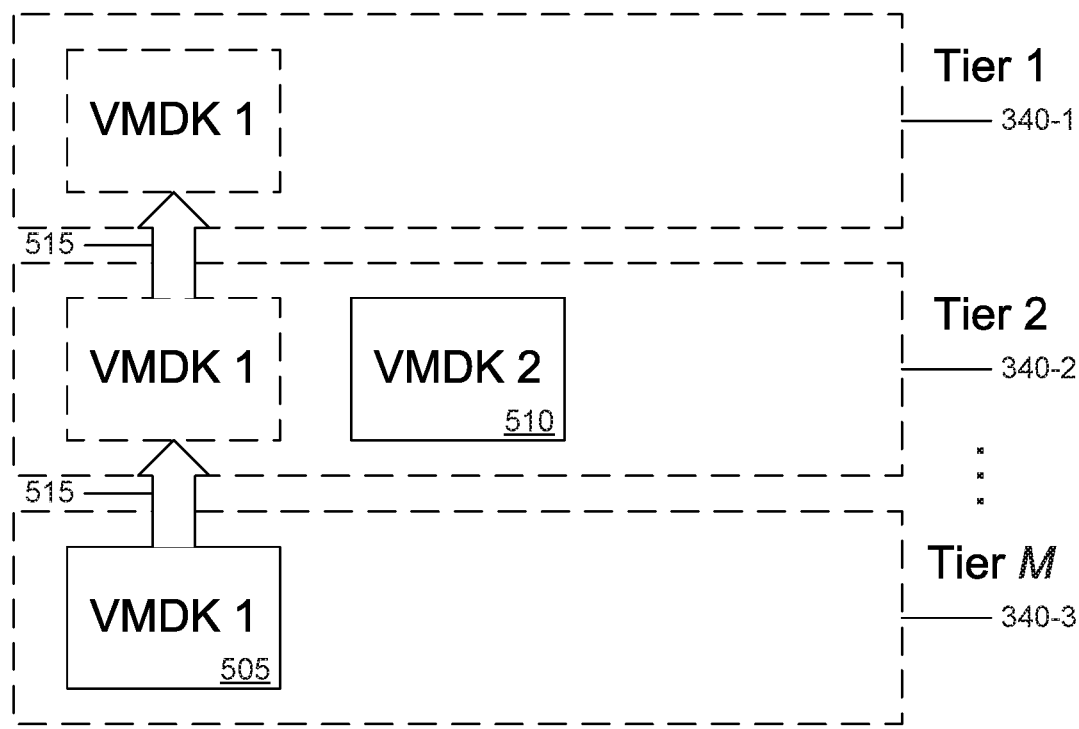
FIG. 5 shows a virtual machine of FIG. 3 being migrated from one storage to another.

FIG. 5 shows the files of the virtual machine of FIG. 3 being migrated from one storage to another. In FIG. 5, virtual machine file 505 stores data for a virtual machine. Virtual machine file 505 is currently residing on storage tier 340-3, while virtual machine file 510, for a second virtual machine, is currently residing on storage tier 340-2. As shown by arrow 515 virtual machine file 505 may be migrated to either storage tier 340-2 or 340-1, depending on what migration Auto-Tiering Controller 335 of FIG. 3 considers would result in the best improvement for system 105 of FIG. 1 overall. Note that Auto-Tiering Controller 335 of FIG. 3 might decide to not migrate a virtual machine to another storage tier, as shown by the fact that virtual machine file 510 is left unmigrated on storage tier 340-2.

While it would be nice for there to be an optimal solution to how virtual machines are assigned to storage tiers that is unchanging (at least, for as long as the set of virtual machines does not change), in practice virtual machines may experience changes in workloads, and may compete for resources with other VMs whose demands may also vary over time. These changes in workloads and competition may affect which storage tier is "best" for a particular virtual machine. For example, at one point in time, one virtual machine might be very busy and require fast response times from storage pool 135 of FIG. 1, but at another point in time that same virtual machine might have a lull in activity and not require a high speed storage tier. Thus, there might not be a single global optimization that works best for all virtual machines all the time.

Figure 6A:
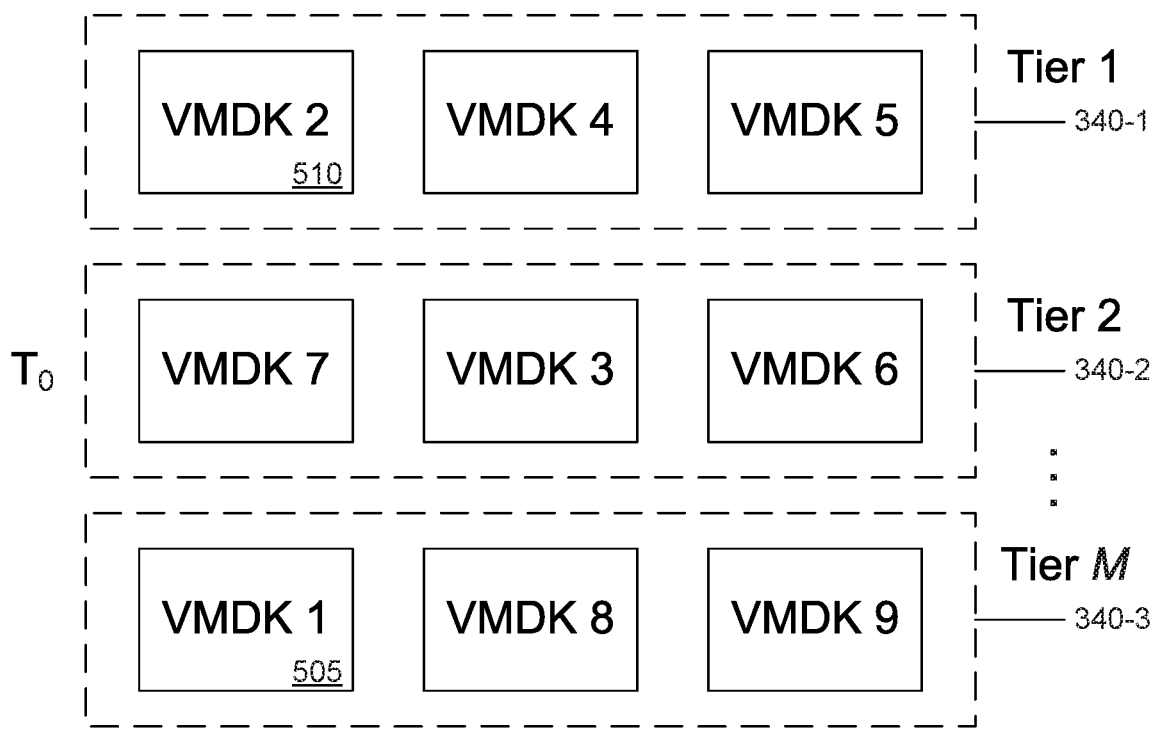
FIGS. 6A-6B show optimal assignments of virtual machines to storage tiers at different points in time.
Figure 6B:
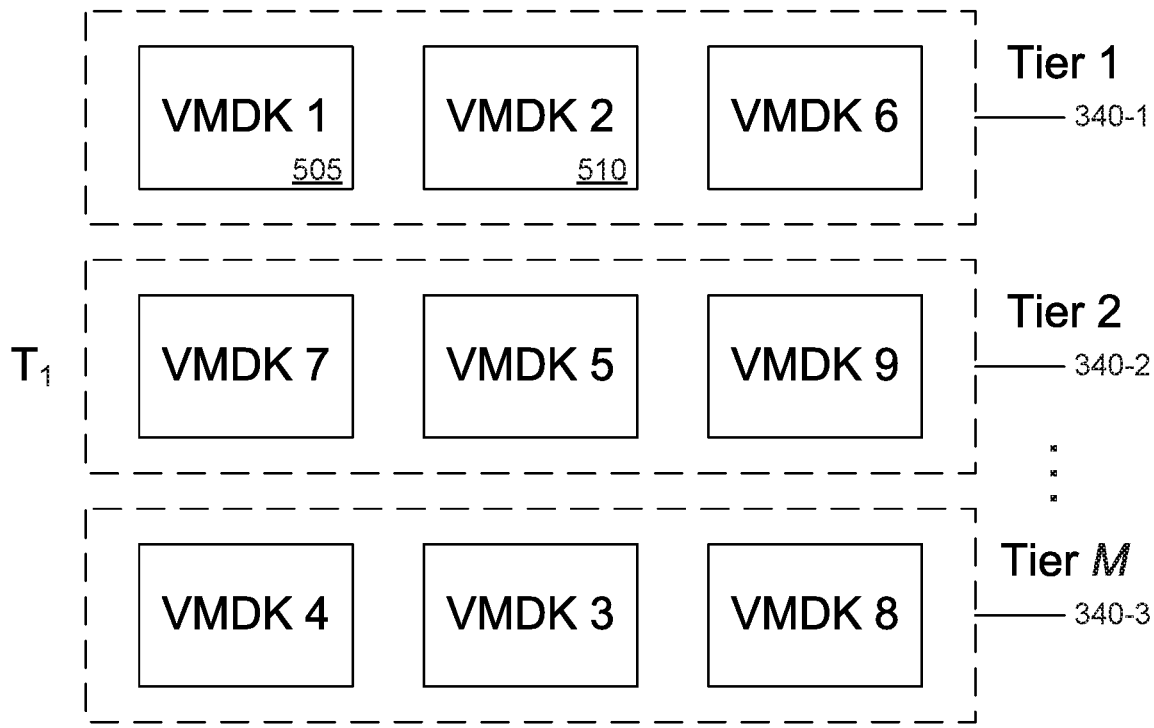

Therefore, instead of looking for a single global optimization, it might be preferable to look for an optimization that works for an interval of time, after which a different optimization might be preferable. For example, FIGS. 6A-6B show optimal assignments of virtual machines to storage tiers at different points in time. For example, in FIG. 6A, at time $T_0$, virtual machine file 505 is optimally in storage tier 340-3 and virtual machine file 510 is optimally in storage tier 340-1. In contrast, in FIG. 6B, at time $T_1$, virtual machine files 505 and 510 are both optimally in storage tier 340-1.

Figure 7:
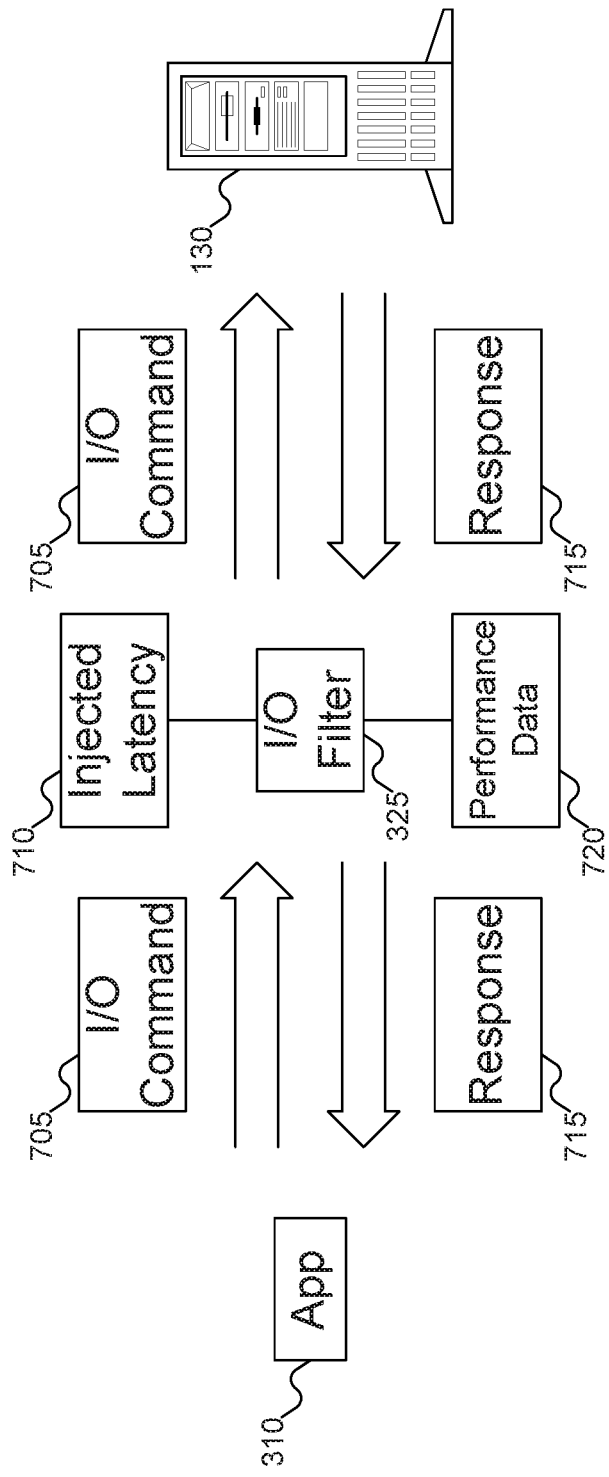
FIG. 7 shows the I/O Filter of FIG. 3 injecting latency and determining performance data for the virtual machine of FIG. 3.

FIG. 7 shows I/O filter 325 of FIG. 3 injecting latency and determining performance data for the virtual machine of FIG. 3. In FIG. 7, I/O filter 325 may receive I/O command 705 from app 310 of virtual machine 305-3 of FIG. 3. I/O filter 325 may then inject latency 710 into I/O command 705. This injected latency may simulate a slower performing storage tier, which produces a different average I/O latency for the virtual machine.

Using injected latency 710, I/O filter 325 may deliver I/O command 705 to data center server 130. Data center server 130 may then process I/O command 705 and return response 715. I/O filter 715 may return response 715 to app 310 and may measure the average I/O latency of virtual machine 305-3 of FIG. 3 using injected latency 710, and produce performance data 720. Auto-Tiering Controller 335 of FIG. 3 may then use performance data 720 to determine whether there is an advantage to migrating the virtual machine to another storage tier (either faster or slower, since migrating the virtual machine to a slower storage tier might free up space for another virtual machine that has a compensating improvement in performance).

While FIG. 7 shows I/O filter 325 using injected latency 710 to generate performance data 710, injected latency 710 has its own overhead. Injected latency 710 may be replaced with a lightweight approach as desired, provided that performance data 710 may be generated. For example, I/O filter 325 might track the number of outstanding I/O commands per virtual machine, and use that information to suggest migrating the virtual machine to another storage tier if the number of outstanding I/O commands remains consistently high or keeps increasing.

Figure 8:
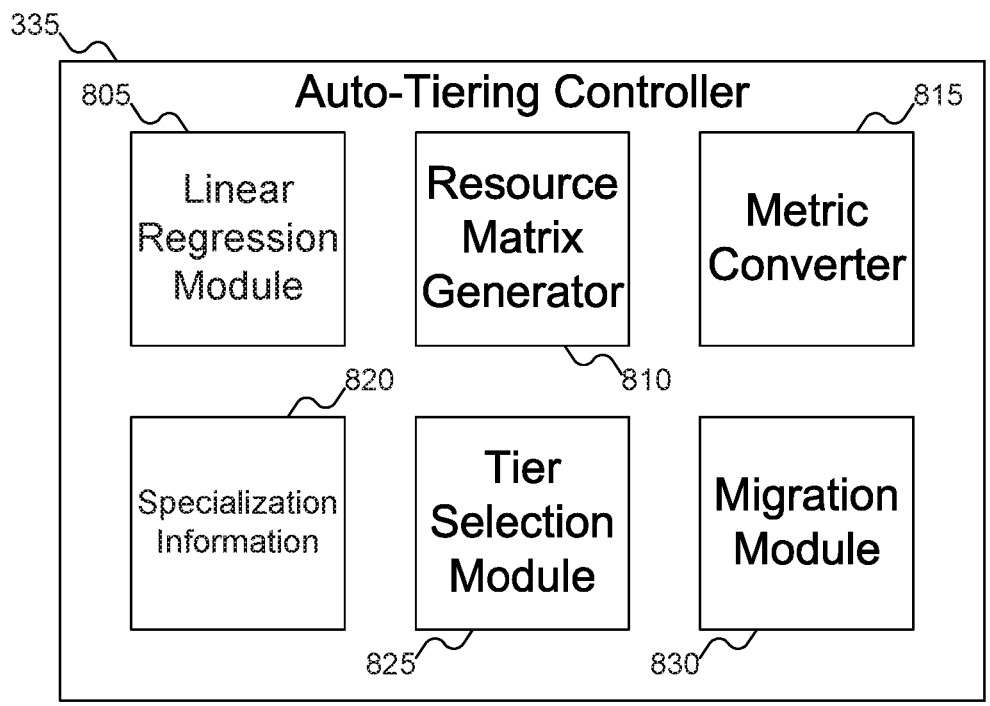
FIG. 8 shows details of the Auto-Tiering Controller of FIG. 3.
Figure 10:
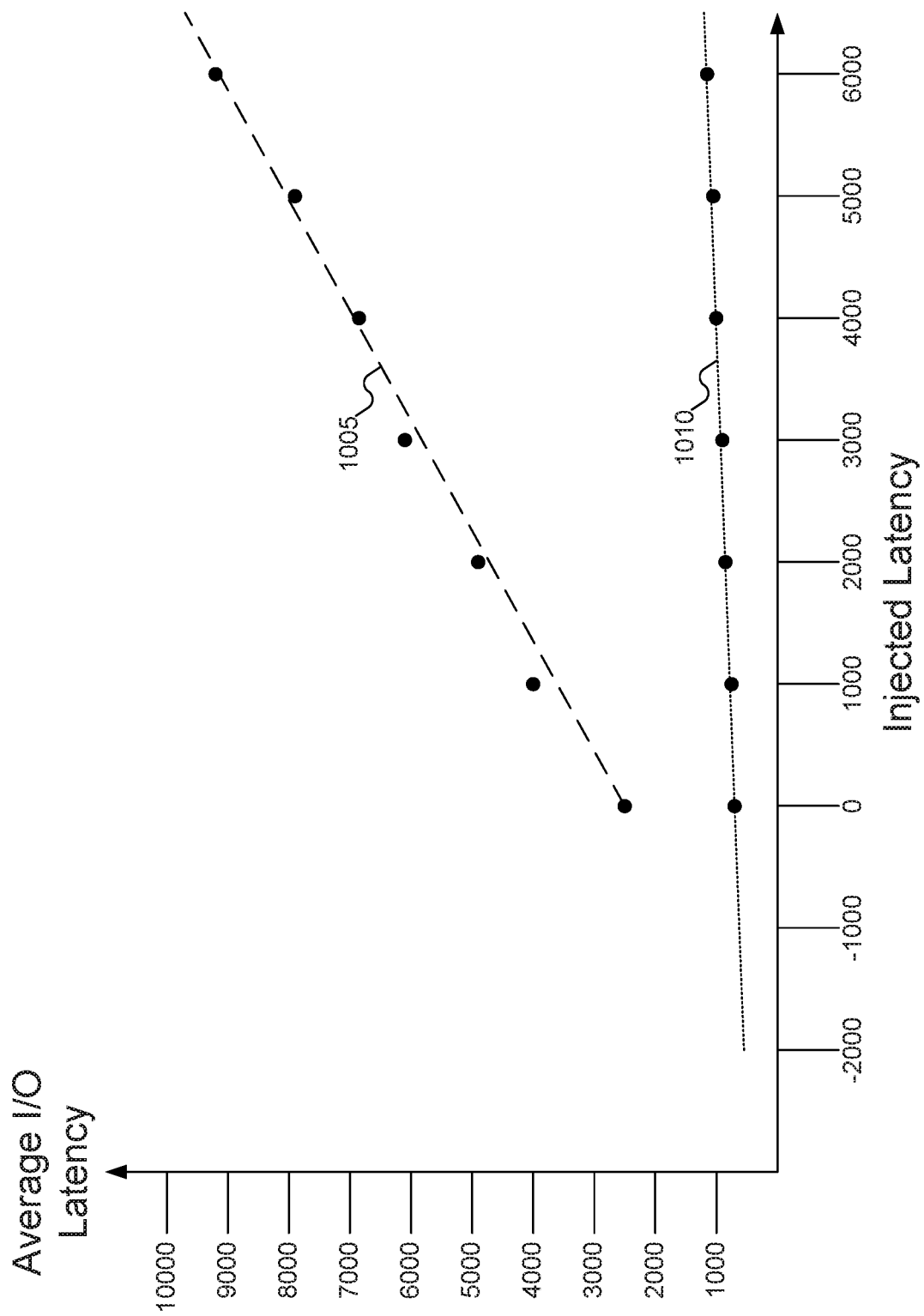
FIG. 10 shows a linear regression of the performance data of FIG. 7.

FIG. 8 shows details of Auto-Tiering Controller 335 of FIG. 3. In FIG. 8, Auto-Tiering Controller 335 may include linear regression module 805, resource matrix generator 810, metric converter 815, specialization information 820, tier selection module 825, and migration module 830. Linear regression module 805 may take performance data 720 of FIG. 7 and perform a linear regression on the data, producing a linear equation that estimates the average I/O latency for a virtual machine for the latency of a given storage tier. As described below with reference to FIG. 10, given injected latencies, average I/O latencies for a given virtual machine may be determined, and these data points plotted on a graph. In some embodiments of the inventive concept, these data points are approximately linear, and a linear regression may produce an equation that approximates the average I/O latency for a given injected latency. Then, knowing the latency of each storage tier, the average I/O latency for a given virtual machine may be estimated for each storage tier.

Resource matrix generator 810 may take the estimates that may be produced from the linear regression to correlate each virtual machine with each storage tier and the resources offered by each storage tier. For example, throughput may be calculated from an average I/O size for a virtual machine and the average I/O latency of the virtual machine, and bandwidth may be calculated from the average I/O size for I/O commands from the VM and the TOPS issued by the VM. Resource matrix generator 810 may use metric converter 815 to convert performance data for one metric, such as throughput, into performance data for another metric, such as bandwidth.

Specialization information 820 may indicate what resources are offered by each storage tier. Specialization information is discussed further with reference to FIG. 11 below.

Tier selection module 825 may take specialization information 820 and the resource matrix generated by resource matrix generator 810, and select storage tiers for virtual machines. Then, if a virtual machine is to be migrated from one storage tier to another, migration module 830 may perform that migration.

Figure 9:
FIG. 9 shows the conversion of the performance data of FIG. 7 into a matrix correlating the virtual machines, the storage tiers, and the resources of the storage tiers.

FIG. 9 shows the conversion of performance data 720 of FIG. 7 into a matrix correlating the virtual machines, the storage tiers, and the resources of the storage tiers. In FIG. 9, performance data 720 is shown as a matrix that indicates an average I/O latency for each virtual machine when using a given storage tier. So, for example, virtual machine 1 is estimated to have an average latency of 800 µs when using storage tier 1, 500 µs when using storage tier 2, and 300 µs when using storage tier 3, with performance data for virtual machines 2 and 3 providing similar information. The numbers shown in FIG. 8 are merely exemplary, and do not necessarily reflect real performance values of any virtual machines in storage tiers, since actual performance depends heavily on both the applications being run by a particular virtual machine and the impact of other virtual machines accessing data from the same storage pool.

Note that some of the values in performance data 720 are not estimates but rather actual values. Specifically, each virtual machine stores its data on some storage tier in storage pool 135 of FIG. 1. Thus, for the storage tier actually storing the data for the virtual machine, the average I/O latency in performance data 720 represents the actual average I/O latency for the virtual machine on that storage tier, rather than an estimate.

Given the estimated average latency for each virtual machine in each storage tier, a multidimensional matrix correlating virtual machines, storage tiers, and resources may be generated. This multidimensional matrix is shown in FIG. 9 as resource matrix 905. Since it is difficult to show a multidimensional matrix on paper, FIG. 9 shows resource matrix 905 as several separate two-dimensional matrices 910, 915, and 920 with each two-dimensional matrix storing data for an individual storage tier, but this is simply for visualization purposes.

In two-dimensional matrix 910 for storage tier 1, the average I/O latency from performance data 720 may be converted into a throughput using the formula $$\frac{10^6}{AverageIOLatency * maxIOPS[t]};$$

that is, $10^6$ (1,000,000) divided by the product of the average I/O latency for the virtual machine in question using that storage tier and the maximum TOPS that storage tier may support (this value may be set by the system administrator to something less than the true maximum offered by the storage tier: for example, 90% of the true maximum). The value $10^6$ may be used because latencies are typically expressed in terms of microseconds $$\left(\text{one microsecond} = \frac{1}{1,000,000}\right).$$

Thus, unless a latency of, say, 12 µs were converted to 0.000012 seconds, an accurate measure of the average I/O latency should reflect the change in units occurring in the equation. Throughput may be converted to bandwidth by multiplying the throughput by the average write size of I/O commands issued by the virtual machine. And the capacity may be calculated from the storage size of the virtual machine files divided by the maximum storage offered by the storage tier (again, the system administrator may set this value to something less than the true maximum). These conversions from performance data 720 to the values stored in resource matrix 905 may be calculated using metric converter 815 of FIG. 8.

FIG. 10 shows a linear regression of performance data 720 of FIG. 7. In FIG. 10, performance data for two different virtual machines are shown. For one virtual machine, the data points on the graph may be approximated by linear regression 1005; for the other virtual machine, the data points on the graph may be approximated by linear regression 1010. While FIG. 10 shows data points for only two virtual machines, embodiments of the inventive concept may support any number of virtual machines for which linear regressions may be computed.

Each data point correlates a particular injected latency with the average I/O latency for the virtual machine. So, for example, when there is no injected latency, the first virtual machine experiences an average I/O latency of 3000 µs whereas the second virtual machine experiences an average I/O latency of approximately 700 µs.

Injected latency works particularly when determining whether the virtual machine would operate adequately using a lower storage tier (that is, a storage tier with a lower level of performance). After all, the amount of injected latency may be exactly the difference between the current storage tier and the target storage tier. But using injected latency it is not possible to emulate a faster storage tier: after all, it is not possible to inject a negative latency, and a storage tier may not respond more quickly than it is actually capable of responding. The solution is as shown with linear regression 1010. Using information about how a virtual machine responds with slower storage tiers, it is possible to estimate the performance of a faster storage tier using the linear regression model. Technically, estimating values outside the range of the provided data is called "extrapolation", as compared with "interpolation", which is the estimation of a value inside the data range. But when using a linear regression such as linear regression 1010, the computations are the same for interpolation and extrapolation. Thus, using linear regression 1010, it is possible to estimate how a virtual machine would respond when using a faster storage tier.

While it is possible to use only data points corresponding to the actual difference in latency between storage tiers, the more data points are available, the better the estimate provided by linear regression module 805 is likely to be. Thus, various different latencies may be injected using I/O filter 325 of FIG. 3 to provide as many data points as desired.

Of course, if every I/O command from the virtual machine were slowed using injected latency, the virtual machine would not receive the true benefit of the assigned storage tier. Thus, injected latency may be used for only a subset of the I/O commands issued by a virtual machine. If the I/O commands selected for injected latency are selected randomly, then performance data 720 of FIG. 7 should provide meaningful linear regressions 1005 and 1010. Known statistical techniques may be used to determine the coefficient of variation (and the confidence) for the data points. If the confidences in the data points are high enough, then linear regressions 1005 and 1010 may be trusted to be accurate estimates. Any desired confidence level may be specified: for example, 90% or 95%. How I/O commands are selected for injected latency is discussed further with reference to FIG. 13 below.

Note that linear regressions 1005 and 1010 show very different data sets: linear regression 1005 includes a fairly steep slope, whereas linear regression 1010 includes a fairly shallow slope. Not all virtual machines respond the same way to changes in the latency of their I/O commands: some virtual machines are more sensitive than others. For example, the virtual machine that generated the data points resulting in linear regression 1005 might be running a synchronous application, where a small change in latency may have a significant impact on the performance of the application. On the other hand, the virtual machine that generated the data points resulting in linear regression 1010 might be running an asynchronous application, where changes in latency have a smaller impact. Or, linear regression 1005 might be for a virtual machine requiring a high throughput, whereas linear regression 1010 might be for a virtual machine requiring a lower throughput. In a similar manner, the sensitivity of a virtual machine may affect its linear regression: more sensitive virtual machines will have steeper slopes, and less sensitive virtual machines will have shallower slopes. A similar concept to sensitivity is whether the virtual machine is tightly coupled or not ("tightly coupled" here referring to how sensitive or dependent the virtual machine is on the response time of the storage tier, similar to the comparison between synchronous and asynchronous applications): the more tightly coupled a virtual machine is, the more likely it is that the slope of its linear regression will be steeper. In general, linear regressions with steep slopes, like linear regression 1005, represent virtual machines that perform better in faster storage tiers, whereas linear regressions with shallow slopes, like linear regression 1010, represent virtual machines that perform adequately in slower storage tiers.

FIG. 11 shows specialization information 820 of FIG. 8 about storage tiers 340-1, 340-2, and 340-3 of FIG. 3. In FIG. 11, specialization information 820 is shown as a matrix. The intersection of each storage tier and each resource may specify a value reflecting whether (and/or how much) that storage tier offers that resource. In some embodiments of the inventive concept, as shown in FIG. 11, specialization information 830 may use binary information (0 vs. 1, yes vs. no, or any other pair of values), where one value indicates that the storage tier offers that resource and the other value indicates that the storage tier does not offer that resource. So, for example, specialization information 820 may be read as indicating that storage tier 1 offers high throughput and high bandwidth, storage tier 2 offers high bandwidth, and storage tier 3 offers high capacity.

In other embodiments of the inventive concept, the values in specialization information 820 need not be limited to binary choices. For example, the values might range from 0 to 1, where 0 indicates that the storage tier does not offer that resource, 1 indicates that the storage tier fully offers that resource, and values in between may represent partial support. So, a value of, say, 0.75 might indicate that a storage tier offers the resource to some extent, but not as well as the "best" storage tiers, whereas a value of, say, 0.25 might indicate that a storage tier offers the resource a little better than the "worst" storage tiers (with "best" and "worst" being relative terms).

FIG. 12 shows the computation of a score matrix to be used in migrating virtual machines 305-1, 305-2, and 305-3 of FIG. 3 to different storage tiers of FIG. 3. By multiplying specialization information 820 with resource matrix 905, score matrix 1205 may be generated that reflects how well each tier supports each virtual machine. For example, values are provided for virtual machine 1, indicating that storage tier 1 is a 55% match, storage tier 2 is a 25% match, and storage tier 3 is a 30% match. (Note that the values do not add up to 100% because each value represents how well each storage tier would support the virtual machine, and not how much of a particular virtual machine should be stored in a particular storage tier.) Entries for the other virtual machines may be interpreted similarly.

Once score matrix 1205 is generated, tier selection 825 of FIG. 8 may select the appropriate tiers for each virtual machine. This selection may be accomplished by computing, for each combination of tier and virtual machine the value FinalScore=AgingFactor×HistoricalFinalScore+
CurrPerfGain−CurrPerfPenalty.

AgingFactor may be a factor used to age older final scores for the combination of virtual machine and storage tier (to prevent older tier selections from overly biasing the results). CurrPerfGain may be the value drawn from score matrix 1205 of FIG. 12 for the combination of virtual machine and tier. CurrPerfPenalty represents the cost of migrating data from one storage tier to another.

Note that, since the virtual machine may reside on a different server than that containing storage pool 135 of FIG. 1, CurrPerfPenalty reflects only the cost of moving the data itself, and does not need to factor in any impact to the operation of the virtual machine. Put another way, since the virtual machine resides on virtual machine server 110-1 of FIG. 1, no processing power on the server hosting the virtual machine is needed to perform the data migration: all processing is done on data center server 130 of FIG. 1. CurrPerfPenalty may be computed by dividing the size of the virtual machine file that needs to be migrated by the lesser of the read throughput rate of the source storage tier and the write throughput rate of the destination storage tier. Put another way, the time required to read the data from the source storage tier and the time required to write the data to the target storage tier are compared, and the larger value is selected as the time required to perform the migration, since whichever is slower (reading the source storage tier or writing the destination storage tier) represents the bottleneck in data migration.

Given the final scores for each combination of virtual machine and storage tier, tier selection module 825 may easily select storage tiers for each virtual machine to globally optimize the overall performance of system 105 by identifying the assignments of virtual machines to storage tiers that provides the overall greatest improvement to performance of system 105 of FIG. 1, factoring in both performance improvements and performance declines (by virtual machines being migrated to less powerful storage tiers) and the cost of migration.

As hinted at above, performing a single global optimization for all time assumes that the workload of each virtual machine does not change, and that the set of virtual machines themselves does not change (no new virtual machines are added and no existing virtual machines are removed). In reality, these conditions are unrealistic. Therefore, if system 105 of FIG. 1 were optimized only once, over time the assignment of virtual machines to storage tiers might no longer be optimal. The solution to this concern is to perform optimization at regular intervals, rather than just once. But performing optimization on a continuous basis is not efficient either: for example, virtual machine I/O commands would have to be subjected to injected latency on a continuous basis, meaning that no virtual machine would receive the full benefit of its storage tier. Thus, rather than performing continuous optimization, optimization may be performed on a periodic basis. To that end, the concepts of the migration epoch and the monitoring epoch are introduced.

Monitoring epochs represent points in time at which I/O filter 325 of FIG. 3 may inject latency into some I/O commands to determine how the virtual machine might perform now in different storage tiers. When monitoring epochs begin, I/O filter 325 of FIG. 3 may inject latency into a selected number of I/O commands. This number of I/O commands may be predetermined as a fixed number, or it may set as a percentage (say, 1%) of the number of I/O command issued during the previous monitoring epoch, or both (say, the greater of the two values). Monitoring epochs may occur at regular intervals, such as every 15 minutes, or every hour, or every day, although embodiments of the inventive concept may support irregular monitoring epochs. Note that there is no simple way to predict what the actual workload of the virtual machine will be when a monitoring epoch begins. Thus, triggering I/O filter 325 of FIG. 3 to inject latency into I/O commands at the start of a monitoring epoch likely will select a random set of I/O commands and provide meaningful performance data 720 of FIG. 7. Once performance data 720 of FIG. 7 has been generated for virtual machines in a given monitoring epoch, Auto-Tiering Daemon 330 of FIG. 3 may send performance data 720 of FIG. 7 to Auto-Tiering Controller 335 of FIG. 3. Alternatively, Auto-Tiering Daemon 330 of FIG. 3 may wait until a migration epoch begins and send performance data 720 of FIG. 7 at that time.

Migration epochs represent points in time at which Auto-Tiering Controller 335 of FIG. 3 may determine whether virtual machines should be migrated from one storage tier to another. As with monitoring epochs, migration epochs may be set to occur at regular or irregular intervals, such as every day or every week. When a monitoring epoch occurs, Auto-Tiering Controller 335 of FIG. 3 may analyze performance data 720 of FIG. 7, generate resource matrix 905 of FIG. 9, compute final scores, select storage tiers for each virtual machine, and migrate virtual machine data if necessary.

FIG. 13 shows the relationship between monitoring epochs and migration epochs. In FIG. 13, migration epoch 1305 and monitoring epoch 1310 are shown. As may be seen in FIG. 13, migration epoch 1305 is typically longer than monitoring epoch 1310, although embodiments of the inventive concept may have migration epoch 1305 be the same or shorter than monitoring epoch 1310. In addition, migration epoch 1305 and monitoring epoch 1310 do not need to align, although they may.

Figure 14:
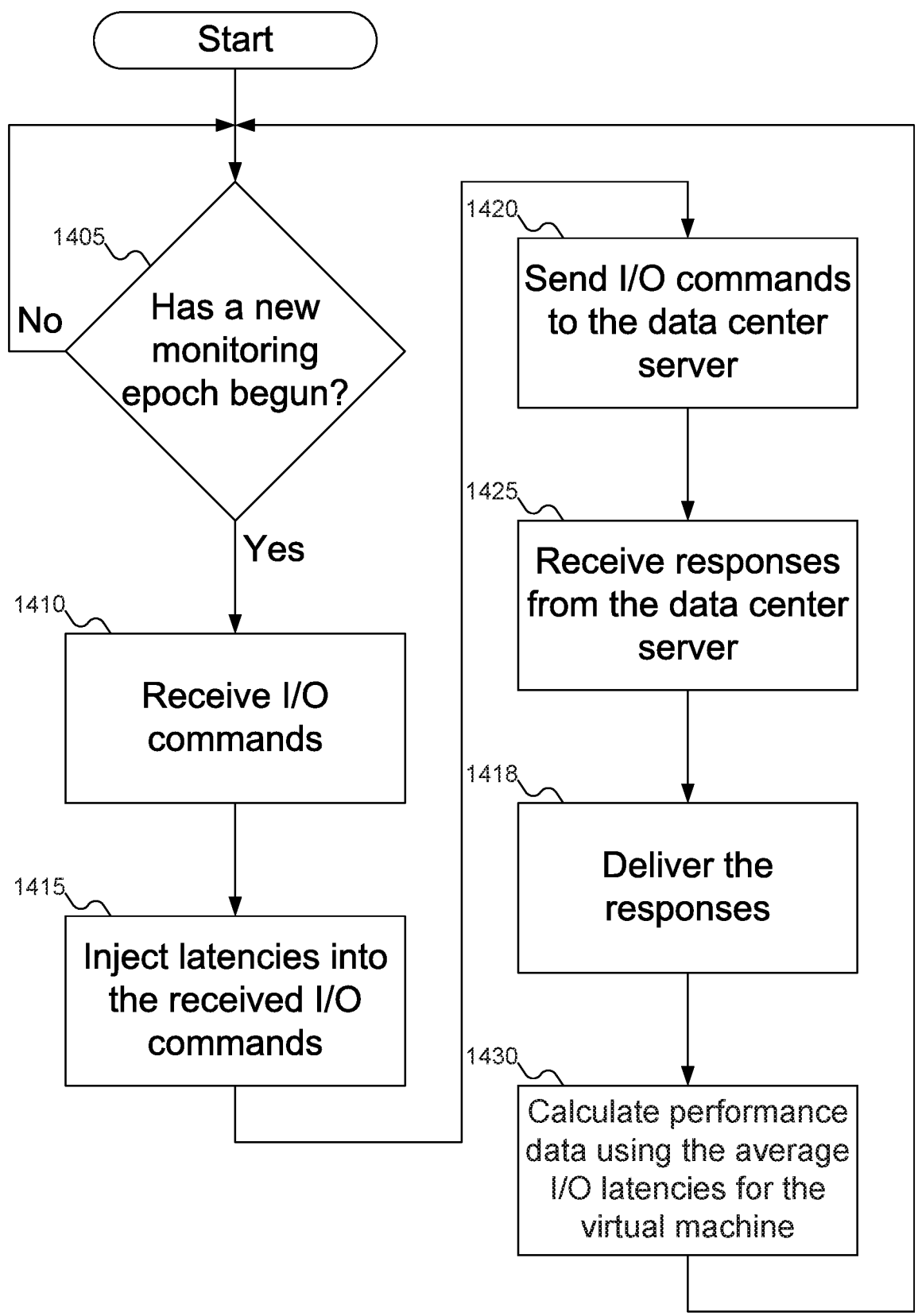
FIG. 14 shows a flowchart of an example procedure for the I/O Filter of FIG. 3 to inject latency into Input/Output (I/O) commands to generate the performance data of FIG. 7, according to an embodiment of the inventive concept.

FIG. 14 shows a flowchart of an example procedure for I/O filter 325 of FIG. 3 to inject latency into Input/Output (I/O) commands 705 of FIG. 7 to generate performance data 3615 of FIG. 7, according to an embodiment of the inventive concept. In FIG. 14, at block 1405, I/O filter 325 of FIG. 3 may determine if a new monitoring epoch 1310 of FIG. 13 as begun. If not, then I/O filter 325 of FIG. 3 may wait.

Otherwise, at block 1410, I/O filter 325 of FIG. 3 may receive some I/O commands 705 of FIG. 7 from application 310 of FIG. 3. How many commands are selected for processing by I/O filter 325 of FIG. 3 in this manner may vary depending on system configuration. At block 1415, I/O filter 325 of FIG. 3 may inject latencies 710 of FIG. 7 into I/O commands 705 of FIG. 7. At block 1420, I/O filter 325 of FIG. 3 may send the commands to data center server 130 of FIG. 1. At block 1425, I/O filter 325 of FIG. 3 may receive response 715 of FIG. 7 from data center server 130 of FIG. 1. At block 1425, I/O filter 325 of FIG. 3 may deliver response 715 of FIG. 7 to application 310 of FIG. 3. Finally, at block 1430, I/O filter 325 of FIG. 3 may calculate performance data 720 of FIG. 7 using average I/O latencies for the virtual machine.

Figure 15A:
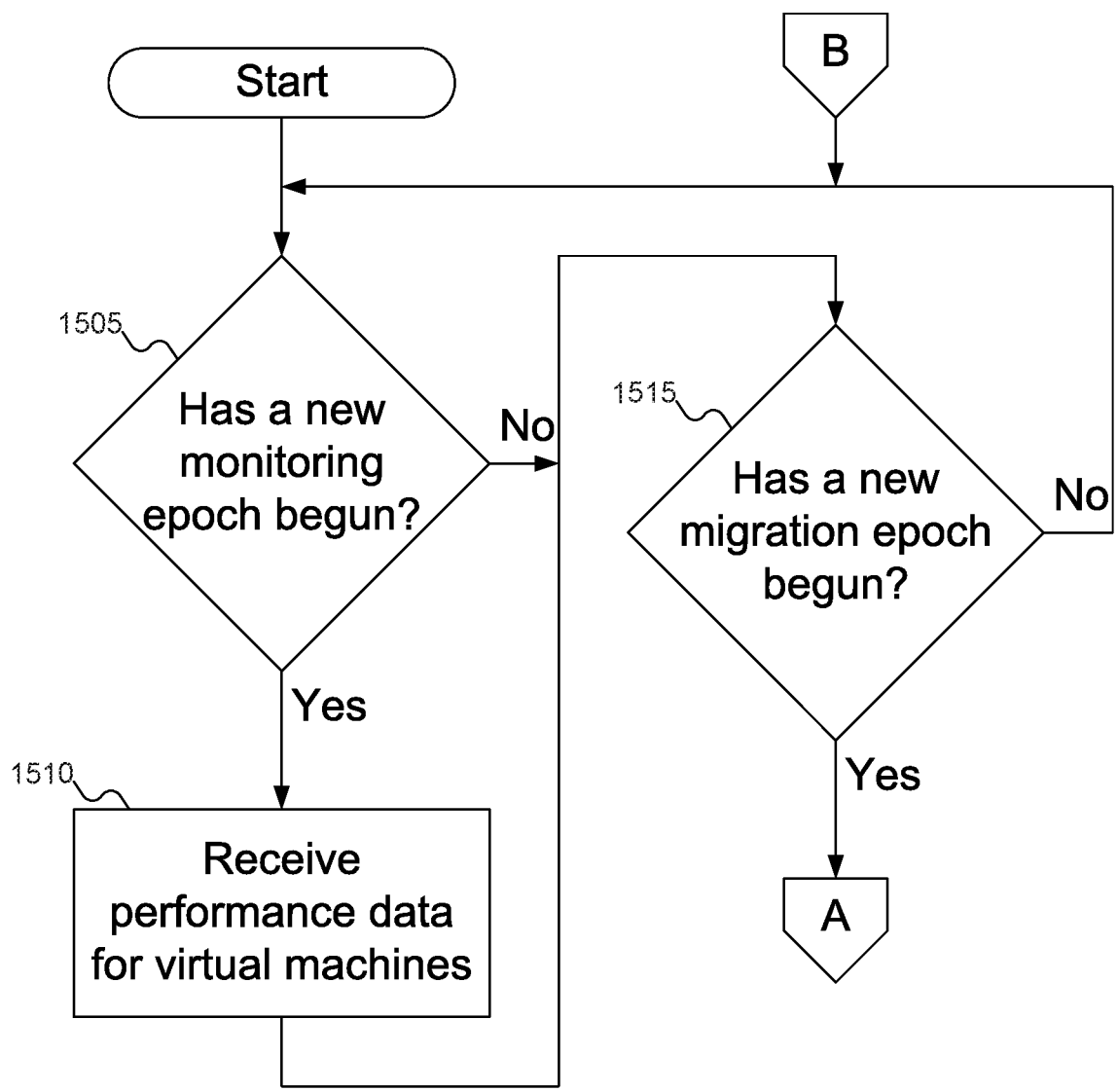
FIGS. 15A-15B show a flowchart of an example procedure for the Auto-Tiering Controller of FIG. 3 to manage migration of virtual machines across storage tiers, according to an embodiment of the inventive concept.
Figure 15B:
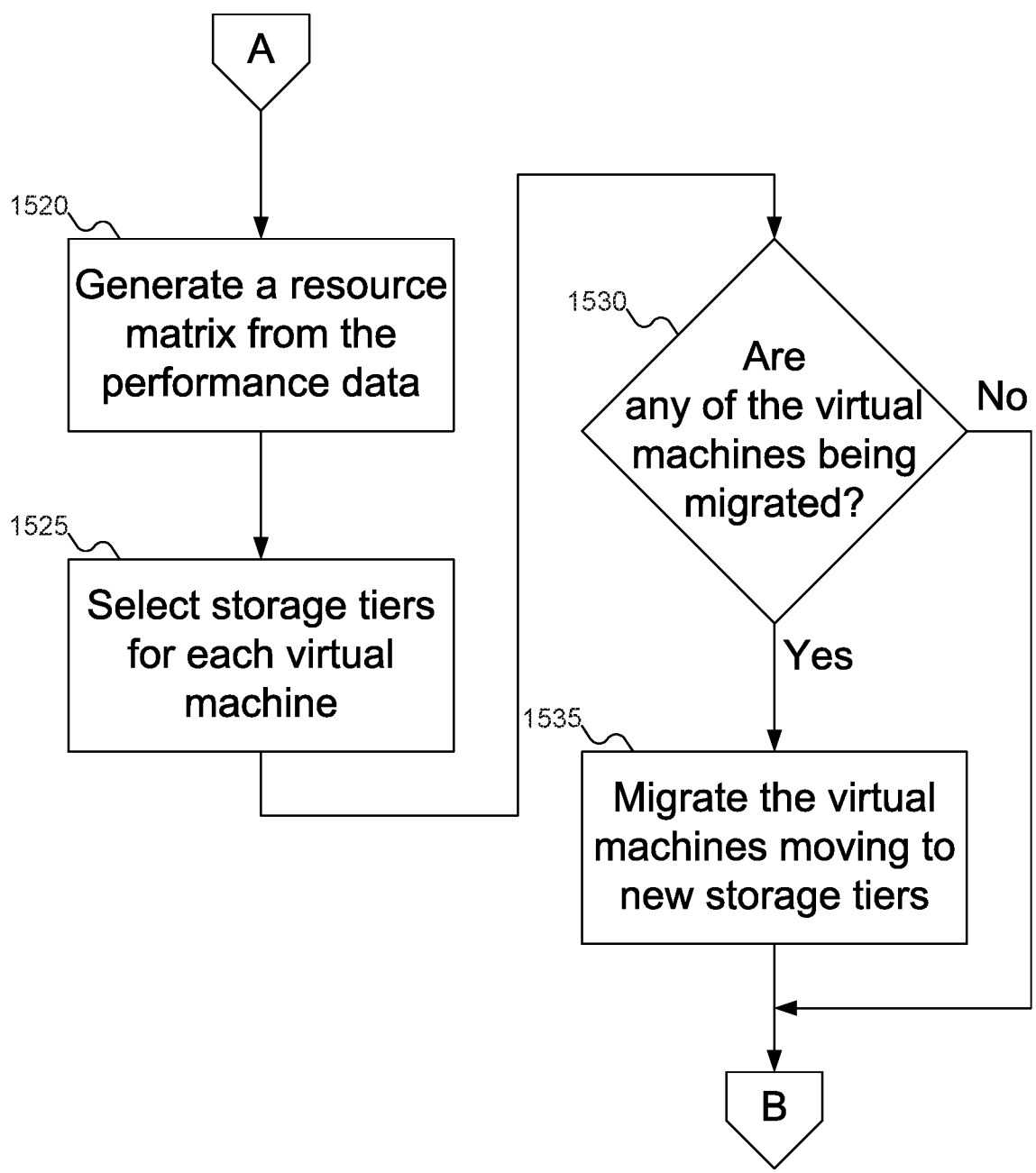

FIGS. 15A-15B show a flowchart of an example procedure for Auto-Tiering Controller 335 of FIG. 3 to manage migration of virtual machines across storage tiers, according to an embodiment of the inventive concept. In FIG. 15A, at block 1505, Auto-Tiering Controller 335 of FIG. 3 may determine if a new monitoring epoch 1310 of FIG. 13 has begun. If not, then Auto-Tiering Controller 335 of FIG. 3 may wait. Otherwise, at block 1510, Auto-Tiering Controller 335 of FIG. 3 may receive performance data 720 of FIG. 7 from Auto-Tiering Daemon 330 of FIG. 3. At block 1515, Auto-Tiering Controller 335 of FIG. 3 may determine if a new migration epoch 1305 of FIG. 13 has begun. If not, then Auto-Tiering Controller 335 of FIG. 3 may wait.

Otherwise, at block 1520, resource matrix generator 810 of FIG. 8 may generate resource matrix 905 of FIG. 9 (using, among other components, linear regression module 805 of FIG. 8 and metric converter 815 of FIG. 8). At block 1525, tier selection module 825 may assign virtual machines to storage tiers using resource matrix 905. At block 1530, Auto-Tiering Controller 335 of FIG. 3 may check to see if any of the virtual machines are being migrated from one storage tier to another. If so, then at block 1535, migration module 830 may migrate virtual machine file 505 of FIG. 5 from one storage tier to another.

Figure 16:
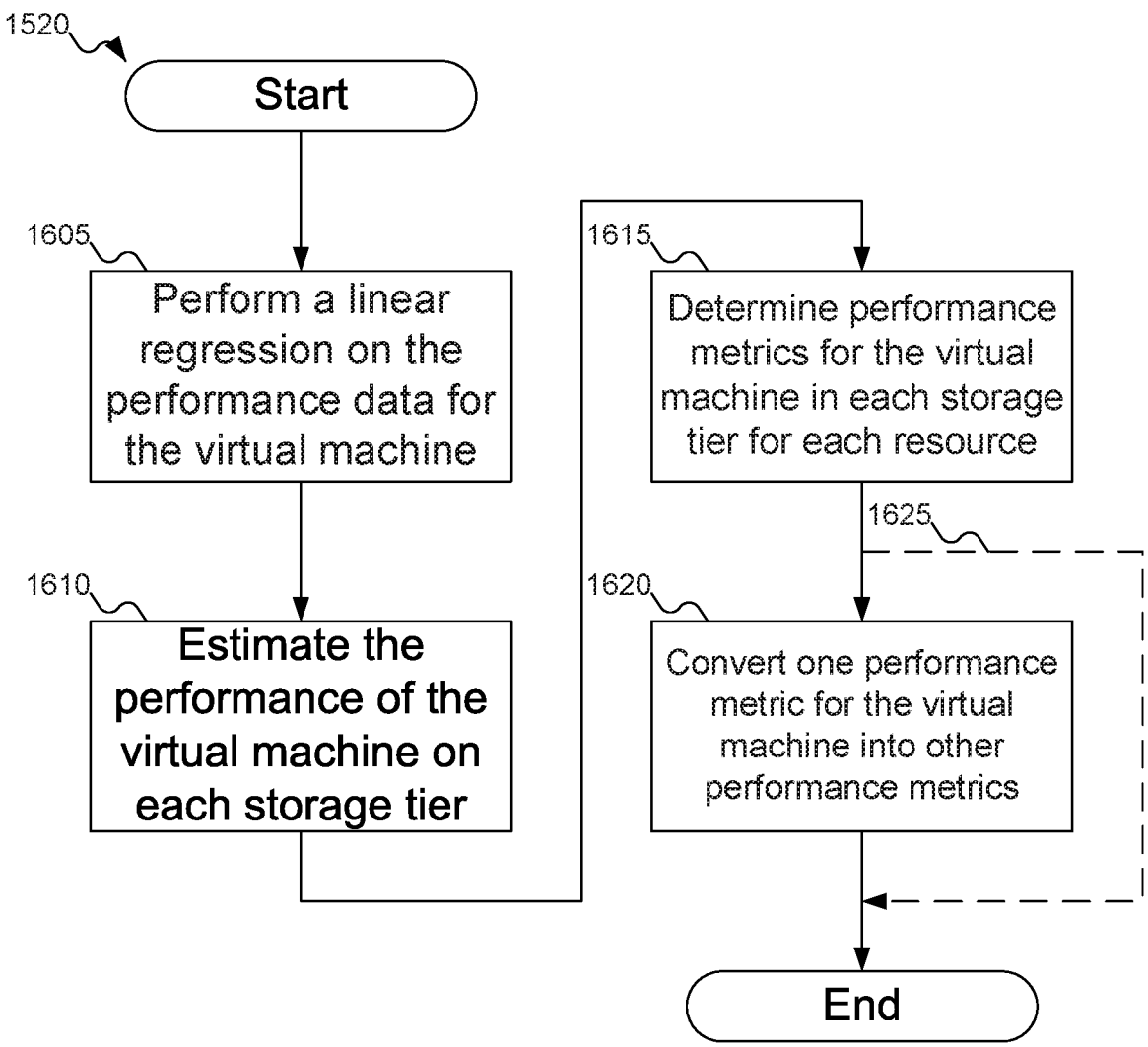
FIG. 16 shows a flowchart of an example procedure for the Auto-Tiering Controller of FIG. 3 to generate the resource matrix of FIG. 9, according to an embodiment of the inventive concept.

FIG. 16 shows a flowchart of an example procedure for Auto-Tiering Controller 335 of FIG. 3 to generate resource matrix 905 of FIG. 9, according to an embodiment of the inventive concept. In FIG. 16, at block 1605, linear regression module 805 of FIG. 8 may perform a linear regression on performance data 720 of FIG. 7 to generate an equation that estimates how well the virtual machine will perform in each storage tier. At block 1610, Auto-Tiering Controller 335 of FIG. 3 may use linear regressions 1005 and 1010 of FIG. 10 to estimate how well each virtual machine will perform in each storage tier. At block 1615, resource matrix generator 810 may generate performance metrics for the virtual machine in each storage tier according to each resource. As shown in block 1620, this may include using metric converter 815 to convert from one metric, such as throughput, to another metric, such as bandwidth. Block 1620 may be omitted, as shown by dashed line 1625.

As may be seen from the above discussion, embodiments of the inventive concept provide significant advantages over conventional tiering and caching solutions. First, embodiments of the inventive concept support considering multiple resources of the storage tiers. Further, as the number of resources may vary, the number of resources may be set to 1, providing backward compatibility for use with conventional HDD storage pools. Second, embodiments of the inventive concept account for the faster performance of flash storage systems, which conventional tiering and caching solutions ignore. Third, embodiments of the inventive concept support both finding a global optimization and adjusting that global optimization over time as changes in the set of existing virtual machines and the workload of the virtual machines—such as workload spikes—occur. This compares favorably with conventional solutions, which generally look for local solutions for individual virtual machines rather than optimizing the system as a whole.

In FIGS. 14-16, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Modules (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), modules, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising:

a plurality of storage devices offering a plurality of resources, the plurality of storage devices organized into a plurality of storage tiers and storing first data for a first virtual machine and second data for a second virtual machine;

a receiver to receive a first Input/Output (I/O) command from the first virtual machine, a second I/O command from the second virtual machine, first performance data modelling the performance of the first virtual machine in the plurality of storage tiers, and second performance data modelling the performance of the second virtual machine in the plurality of storage tiers;

a transmitter to transmit a first response to the first I/O command to the first virtual machine and a second response to the second I/O command to the second virtual machine; and an auto-tiering controller to select a first storage tier to store the first data for the first virtual machine, to select a second storage tier to store the second data for the second virtual machine, and to migrate at least one of the first data for the first virtual machine to the first storage tier or the second data for the second virtual machine to the second storage tier responsive to the first performance data and the second performance data, wherein the auto-tiering controller is operative to select the first storage tier to store the first data for the first virtual machine and to select the second storage tier to store the second data for the second virtual machine to optimize the performance of all virtual machines across the plurality of storage tiers, wherein the auto-tiering controller is operative to factor in a change in performance resulting from migrating the at least one of the first data for the first virtual machine to the first storage tier or the second data for the second virtual machine to the second storage tier and a migration cost of migrating at least one of the first data for the first virtual machine to the first storage tier or the second data for the second virtual machine to the second storage tier.

Statement 2. An embodiment of the inventive concept includes a system according to statement 1, wherein:

the system further comprises a processor; and the auto-tiering controller includes software running on the processor.

Statement 3. An embodiment of the inventive concept includes a system according to statement 1, wherein the auto-tiering controller includes:

a tier selection module to select the first storage tier for the first virtual machine and the second storage tier for the second virtual machine responsive to the first performance data and the second performance data; and a migration module to migrate at least one of the first data for the first virtual machine to the first storage tier or the second data for the second virtual machine to the second storage tier.

Statement 4. An embodiment of the inventive concept includes a system according to statement 1, wherein the auto-tiering controller includes a resource matrix generator to generate a resource matrix correlating the first virtual machine and the second virtual machine with each of the plurality of storage tiers and a plurality of resources for each of the plurality of storage tiers using the first performance data and the second performance data.

Statement 5. An embodiment of the inventive concept includes a system according to statement 4, wherein the auto-tiering controller is operative to select a first storage tier to store the first data for the first virtual machine and to select a second storage tier to store the second data for the second virtual machine responsive to the resource matrix.

Statement 6. An embodiment of the inventive concept includes a system according to statement 5, wherein the auto-tiering controller is operative to select a first storage tier to store the first data for the first virtual machine and to select a second storage tier to store the second data for the second virtual machine responsive to the resource matrix and specialization information for each of the plurality of storage tiers.

Statement 7. An embodiment of the inventive concept includes a system according to statement 6, wherein the specialization information for each of the plurality of storage tiers identifies whether each of the plurality of storage tiers supports each of the plurality of resources.

Statement 8. An embodiment of the inventive concept includes a system according to statement 7, wherein the plurality of resources include throughput, bandwidth, capacity, and write amplification.

Statement 9. An embodiment of the inventive concept includes a system according to statement 4, wherein the resource matrix generator includes a metric converter to convert a first performance metric for the first virtual machine in each of the plurality of storage tiers into a second performance metric for the first virtual machine in each of the plurality of storage tiers according to a second resource of the plurality of resources.

Statement 10. An embodiment of the inventive concept includes a system according to statement 9, wherein the first performance metric includes a first average I/O latency data for the first virtual machine.

Statement 11. An embodiment of the inventive concept includes a system according to statement 1, wherein:

the auto-tiering controller includes a linear regression module to perform a first linear regression on the first performance data and to perform a second linear regression on the second performance data; and the auto-tiering controller is operative to select the first storage tier to store the first data for the first virtual machine and to select the second storage tier to store the second data for the second virtual machine responsive to the first linear regression and the second linear regression.

Statement 12. An embodiment of the inventive concept includes a system according to statement 11, wherein the auto-tiering controller is operative to select the first storage tier to store the first data for the first virtual machine and to select the second storage tier to store the second data for the second virtual machine using estimated average I/O latencies for the first virtual machine and the second virtual machine responsive to the first linear regression and the second linear regression.

Statement 13. An embodiment of the inventive concept includes a system according to statement 1, wherein:

the first performance data includes first metric performance data using a first resource; and the auto-tiering controller includes a metric converter to convert the first metric performance data using the first resource into a second metric performance data using a second resource.

Statement 14. An embodiment of the inventive concept includes a system according to statement 1, wherein the auto-tiering controller is operative to select a first storage tier to store the first data for the first virtual machine, to select a second storage tier to store the second data for the second virtual machine, and to migrate at least one of the first data for the first virtual machine to the first storage tier or the second data for the second virtual machine to the second storage tier responsive to the first performance data and the second performance data once per migration epoch.

Statement 15. An embodiment of the inventive concept includes a system according to statement 14, wherein:

the first performance data includes first performance data from a plurality of monitoring epochs within the migration epoch; and the second performance data includes second performance data from the plurality of monitoring epochs within the migration epoch.

Statement 16. An embodiment of the inventive concept includes a system according to statement 1, further comprising:

a first virtual machine server storing the first virtual machine; and a second virtual machine server storing the second virtual machine.

Statement 17. An embodiment of the inventive concept includes a system according to statement 16, wherein the second virtual machine server is the first virtual machine server.

Statement 18. An embodiment of the inventive concept includes a system according to statement 16, wherein the first virtual machine server includes an I/O filter to generate the first performance data modelling the performance of the first virtual machine in the plurality of storage tiers.

Statement 19. An embodiment of the inventive concept includes a system according to statement 18, wherein the I/O filter is operative to inject latency into a plurality of I/O commands from the first virtual machine, the plurality of I/O commands including the first I/O command, and determine an average I/O latency for the first virtual machine responsive to the injected latency.

Statement 20. An embodiment of the inventive concept includes a system according to statement 19, wherein:

the I/O filter is further operative to inject a plurality of latencies into the plurality of I/O commands from the first virtual machine, and determine a plurality of average I/O latencies for the first virtual machine responsive to the injected latencies; and the auto-tiering controller includes a linear regression module to perform a first linear regression on the plurality of average I/O latencies for the first virtual machine.

Statement 21. An embodiment of the inventive concept includes a system according to statement 18, wherein the first virtual machine server further includes an auto-tiering daemon to collect the performance data for a plurality of virtual machines from the I/O filter and transmit the collected performance data to the auto-tiering controller.

Statement 22. An embodiment of the inventive concept includes a system according to statement 16, wherein:

the first virtual machine server does not include a first local cache to store any of the first data for the first virtual machine; and the second virtual machine server does not include a second local cache to store any of the second data for the second virtual machine.

Statement 23. An embodiment of the inventive concept includes a method according to statement 1, wherein the change in performance resulting from migrating the at least one of the first data for the first virtual machine to the first storage tier or the second data for the second virtual machine to the second storage tier includes an improvement in the performance of the first virtual machine.

Statement 24. An embodiment of the inventive concept includes a method according to statement 1, wherein the change in performance resulting from migrating the at least one of the first data for the first virtual machine to the first storage tier or the second data for the second virtual machine to the second storage tier includes an decline in the performance of the first virtual machine.

Statement 25. An embodiment of the inventive concept includes a method according to statement 1, wherein the migration cost of at least one of the first data for the first virtual machine to the first storage tier or the second data for the second virtual machine to the second storage tier includes a migration time required to migrate the at least one of the first data for the first virtual machine to the first storage tier or the second data for the second virtual machine to the second storage tier.

Statement 26. An embodiment of the inventive concept includes a system according to statement 1, wherein the second storage tier is the first storage tier.

Statement 27. An embodiment of the inventive concept includes a system according to statement 1, wherein the plurality of storage devices in one of the plurality of storage tiers are homogeneous.

Statement 28. An embodiment of the inventive concept includes a method, comprising:

receiving first performance data modelling the performance of a first virtual machine in a plurality of storage tiers;

receiving second performance data modelling the performance of a second virtual machine in the plurality of storage tiers;

generating a resource matrix correlating the first virtual machine and the second virtual machine with each of the plurality of storage tiers and a plurality of resources for each of the plurality of storage tiers using the first performance data and the second performance data;

selecting a first storage tier of the plurality of storage tiers to store first data for the first virtual machine using the resource matrix;

selecting a second storage tier of the plurality of storage tiers to store second data for the second virtual machine using the resource matrix; and migrating at least one of the first data for the first virtual machine to the first storage tier or the second data for the second virtual machine to the second storage tier, wherein selecting the first storage tier to store the first data for the first virtual machine and selecting the second storage tier to store the second data for the second virtual machine optimizes the performance of all virtual machines across the plurality of storage tiers, wherein selecting the first storage tier to store the first data for the first virtual machine and selecting the second storage tier to store the second data for the second virtual machine factors in a change in performance resulting from migrating the at least one of the first data for the first virtual machine to the first storage tier or the second data for the second virtual machine to the second storage tier, and wherein selecting the first storage tier to store the first data for the first virtual machine and selecting the second storage tier to store the second data for the second virtual machine factors in a migration cost of migrating at least one of the first data for the first virtual machine to the first storage tier or the second data for the second virtual machine to the second storage tier.

Statement 29. An embodiment of the inventive concept includes a method according to statement 28, wherein the second storage tier is the first storage tier.

Statement 30. An embodiment of the inventive concept includes a method according to statement 28, wherein receiving first performance data, receiving second performance data, generating a resource matrix, selecting a first storage tier, and selecting a second storage tier is performed once per migration epoch.

Statement 31. An embodiment of the inventive concept includes a method according to statement 30, wherein receiving first performance data and receiving second performance data is performed once per monitoring epoch.

Statement 32. An embodiment of the inventive concept includes a method according to statement 31, wherein the migration epoch includes a plurality of monitoring epochs.

Statement 33. An embodiment of the inventive concept includes a method according to statement 28, wherein:

selecting a first storage tier of the plurality of storage tiers to store first data for the first virtual machine using the resource matrix includes selecting the first storage tier of the plurality of storage tiers to store first data for the first virtual machine using the resource matrix and specialization information for each of the plurality of storage tiers; and selecting a second storage tier of the plurality of storage tiers to store second data for the second virtual machine using the resource matrix includes selecting the second storage tier of the plurality of storage tiers to store second data for the second virtual machine using the resource matrix and the specialization information for each of the plurality of storage tiers.

Statement 34. An embodiment of the inventive concept includes a method according to statement 33, wherein the specialization information for each of the plurality of storage tiers identifies whether each of the plurality of storage tiers supports each of the plurality of resources.

Statement 35. An embodiment of the inventive concept includes a method according to statement 34, wherein the plurality of resources include throughput, bandwidth, capacity, and write amplification.

Statement 36. An embodiment of the inventive concept includes a method according to statement 34, wherein the first performance data modelling the performance of the first virtual machine in the plurality of storage tiers includes a plurality of data points correlating average Input/Output (I/O) latencies for the first virtual machine with injected latencies.

Statement 37. An embodiment of the inventive concept includes a method according to statement 36, wherein generating a resource matrix correlating the first virtual machine and the second virtual machine with each of the plurality of storage tiers and a plurality of resources for each of the plurality of storage tiers using the first performance data and the second performance data includes performing a linear regression of the plurality of data points correlating average I/O latencies for the first virtual machine with injected latencies.

Statement 38. An embodiment of the inventive concept includes a method according to statement 37, wherein generating a resource matrix correlating the first virtual machine and the second virtual machine with each of the plurality of storage tiers and a plurality of resources for each of the plurality of storage tiers using the first performance data and the second performance data further includes estimating a performance of the first virtual machine on each of the plurality of storage tiers using the linear regression.

Statement 39. An embodiment of the inventive concept includes a method according to statement 37, wherein generating a resource matrix correlating the first virtual machine and the second virtual machine with each of the plurality of storage tiers and a plurality of resources for each of the plurality of storage tiers using the first performance data and the second performance data further includes determining performance metrics for the first virtual machine in each of the plurality of storage tiers according to each of the plurality of resources.

Statement 40. An embodiment of the inventive concept includes a method according to statement 39, wherein determining performance metrics for the first virtual machine in each of the plurality of storage tiers according to each of the plurality of resources includes converting a first performance metric for the first virtual machine in each of the plurality of storage tiers according to a first resource of the plurality of resources into a second performance metric for the first virtual machine in each of the plurality of storage tiers according to a second resource of the plurality of resources.

Statement 41. An embodiment of the inventive concept includes a method according to statement 28, wherein receiving first performance data modelling the performance of a first virtual machine in a plurality of storage tiers includes:

receiving a plurality of first I/O commands from the virtual machine at an I/O filter;

injecting a first latency into the plurality of first I/O commands; and calculating a first average I/O latency for the virtual machine for the plurality of first I/O commands.

Statement 42. An embodiment of the inventive concept includes a method according to statement 41, wherein:

injecting a first latency into the plurality of first I/O commands includes injecting a plurality of latencies into the plurality of first I/O commands;

calculating a first average I/O latency for the virtual machine for the plurality of first I/O commands includes calculating a plurality of average I/O latencies for the virtual machine for the plurality of first I/O commands; and the method further comprises performing a linear regression of the plurality of average I/O latencies.

Statement 43. An embodiment of the inventive concept includes a method according to statement 28, wherein the change in performance resulting from migrating the at least one of the first data for the first virtual machine to the first storage tier or the second data for the second virtual machine to the second storage tier includes an improvement in the performance of the first virtual machine.

Statement 44. An embodiment of the inventive concept includes a method according to statement 28, wherein the change in performance resulting from migrating the at least one of the first data for the first virtual machine to the first storage tier or the second data for the second virtual machine to the second storage tier includes an decline in the performance of the first virtual machine.

Statement 45. An embodiment of the inventive concept includes a method according to statement 28, wherein the migration cost of at least one of the first data for the first virtual machine to the first storage tier or the second data for the second virtual machine to the second storage tier includes a migration time required to migrate the at least one of the first data for the first virtual machine to the first storage tier or the second data for the second virtual machine to the second storage tier.

Statement 46. An embodiment of the inventive concept includes an article, comprising a non-transitory storage medium, the non-transitory storage medium having stored thereon instructions that, when executed by a machine, result in:

receiving first performance data modelling the performance of a first virtual machine in a plurality of storage tiers;

receiving second performance data modelling the performance of a second virtual machine in the plurality of storage tiers;

generating a resource matrix correlating the first virtual machine and the second virtual machine with each of the plurality of storage tiers and a plurality of resources for each of the plurality of storage tiers using the first performance data and the second performance data;

selecting a first storage tier of the plurality of storage tiers to store first data for the first virtual machine using the resource matrix;

selecting a second storage tier of the plurality of storage tiers to store second data for the second virtual machine using the resource matrix; and migrating at least one of the first data for the first virtual machine to the first storage tier or the second data for the second virtual machine to the second storage tier, wherein selecting the first storage tier to store the first data for the first virtual machine and selecting the second storage tier to store the second data for the second virtual machine optimizes the performance of all virtual machines across the plurality of storage tiers, wherein selecting the first storage tier to store the first data for the first virtual machine and selecting the second storage tier to store the second data for the second virtual machine factors in a change in performance resulting from migrating the at least one of the first data for the first virtual machine to the first storage tier or the second data for the second virtual machine to the second storage tier, and wherein selecting the first storage tier to store the first data for the first virtual machine and selecting the second storage tier to store the second data for the second virtual machine factors in a migration cost of migrating at least one of the first data for the first virtual machine to the first storage tier or the second data for the second virtual machine to the second storage tier.

Statement 47. An embodiment of the inventive concept includes an article according to statement 46, wherein the second storage tier is the first storage tier.

Statement 48. An embodiment of the inventive concept includes an article according to statement 46, wherein receiving first performance data, receiving second performance data, generating a resource matrix, selecting a first storage tier, and selecting a second storage tier is performed once per migration epoch.

Statement 49. An embodiment of the inventive concept includes an article according to statement 48, wherein receiving first performance data and receiving second performance data is performed once per monitoring epoch.

Statement 50. An embodiment of the inventive concept includes an article according to statement 49, wherein the migration epoch includes a plurality of monitoring epochs.

Statement 51. An embodiment of the inventive concept includes an article according to statement 46, wherein:

selecting a first storage tier of the plurality of storage tiers to store first data for the first virtual machine using the resource matrix includes selecting the first storage tier of the plurality of storage tiers to store first data for the first virtual machine using the resource matrix and specialization information for each of the plurality of storage tiers; and selecting a second storage tier of the plurality of storage tiers to store second data for the second virtual machine using the resource matrix includes selecting the second storage tier of the plurality of storage tiers to store second data for the second virtual machine using the resource matrix and the specialization information for each of the plurality of storage tiers.

Statement 52. An embodiment of the inventive concept includes an article according to statement 51, wherein the specialization information for each of the plurality of storage tiers identifies whether each of the plurality of storage tiers supports each of the plurality of resources.

Statement 53. An embodiment of the inventive concept includes an article according to statement 52, wherein the plurality of resources include throughput, bandwidth, capacity, and write amplification.

Statement 54. An embodiment of the inventive concept includes an article according to statement 52, wherein the first performance data modelling the performance of the first virtual machine in the plurality of storage tiers includes a plurality of data points correlating average Input/Output (I/O) latencies for the first virtual machine with injected latencies.

Statement 55. An embodiment of the inventive concept includes an article according to statement 54, wherein generating a resource matrix correlating the first virtual machine and the second virtual machine with each of the plurality of storage tiers and a plurality of resources for each of the plurality of storage tiers using the first performance data and the second performance data includes performing a linear regression of the plurality of data points correlating average I/O latencies for the first virtual machine with injected latencies.

Statement 56. An embodiment of the inventive concept includes an article according to statement 55, wherein generating a resource matrix correlating the first virtual machine and the second virtual machine with each of the plurality of storage tiers and a plurality of resources for each of the plurality of storage tiers using the first performance data and the second performance data further includes estimating a performance of the first virtual machine on each of the plurality of storage tiers using the linear regression.

Statement 57. An embodiment of the inventive concept includes an article according to statement 55, wherein generating a resource matrix correlating the first virtual machine and the second virtual machine with each of the plurality of storage tiers and a plurality of resources for each of the plurality of storage tiers using the first performance data and the second performance data further includes determining performance metrics for the first virtual machine in each of the plurality of storage tiers according to each of the plurality of resources.

Statement 58. An embodiment of the inventive concept includes an article according to statement 57, wherein determining performance metrics for the first virtual machine in each of the plurality of storage tiers according to each of the plurality of resources includes converting a first performance metric for the first virtual machine in each of the plurality of storage tiers according to a first resource of the plurality of resources into a second performance metric for the first virtual machine in each of the plurality of storage tiers according to a second resource of the plurality of resources.

Statement 59. An embodiment of the inventive concept includes an article according to statement 46, wherein receiving first performance data modelling the performance of a first virtual machine in a plurality of storage tiers includes:

receiving a first I/O command from the virtual machine at an I/O filter;

injecting a first latency into the first I/O command; and calculating a first average I/O latency for the virtual machine for the first I/O command.

Statement 60. An embodiment of the inventive concept includes an article according to statement 59, wherein:

injecting a first latency into the plurality of first I/O commands includes injecting a plurality of latencies into the plurality of first I/O commands;

calculating a first average I/O latency for the virtual machine for the plurality of first I/O commands includes calculating a plurality of average I/O latencies for the virtual machine for the plurality of first I/O commands; and the non-transitory storage medium has stored thereon further instructions that, when executed by the machine, result in performing a linear regression of the plurality of average I/O latencies.

Statement 61. An embodiment of the inventive concept includes an article according to statement 46, wherein the change in performance resulting from migrating the at least one of the first data for the first virtual machine to the first storage tier or the second data for the second virtual machine to the second storage tier includes an improvement in the performance of the first virtual machine.

Statement 62. An embodiment of the inventive concept includes an article according to statement 46, wherein the change in performance resulting from migrating the at least one of the first data for the first virtual machine to the first storage tier or the second data for the second virtual machine to the second storage tier includes an decline in the performance of the first virtual machine.

Statement 63. An embodiment of the inventive concept includes an article according to statement 46, wherein the migration cost of at least one of the first data for the first virtual machine to the first storage tier or the second data for the second virtual machine to the second storage tier includes a migration time required to migrate the at least one of the first data for the first virtual machine to the first storage tier or the second data for the second virtual machine to the second storage tier.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
 a plurality of storage devices offering a plurality of resources, the plurality of storage devices organized into a plurality of storage tiers and storing first data for a first virtual machine and second data for a second virtual machine;
 a receiver to receive a first Input/Output (I/O) command from the first virtual machine, a second I/O command from the second virtual machine, first performance data modelling the performance of the first virtual machine in the plurality of storage tiers, and second performance data modelling the performance of the second virtual machine in the plurality of storage tiers;
 a transmitter to transmit a first response to the first I/O command to the first virtual machine and a second response to the second I/O command to the second virtual machine; and
 an auto-tiering controller to select a first storage tier to store the first data for the first virtual machine, to select a second storage tier to store the second data for the second virtual machine, and to migrate at least one of the first data for the first virtual machine to the first storage tier or the second data for the second virtual machine to the second storage tier responsive to the first performance data and the second performance data,
 wherein the auto-tiering controller is operative to select the first storage tier to store the first data for the first virtual machine and to select the second storage tier to store the second data for the second virtual machine to optimize the performance of all virtual machines across the plurality of storage tiers, wherein the auto-tiering controller is operative to factor in a change in performance resulting from migrating the at least one of the first data for the first virtual machine to the first storage tier or the second data for the second virtual machine to the second storage tier and a migration cost of migrating at least one of the first data for the first virtual machine to the first storage tier or the second data for the second virtual machine to the second storage tier.

2. A system according to claim 1, wherein the auto-tiering controller includes:

a tier selection module implemented using at least a processor, to select the first storage tier for the first virtual machine and the second storage tier for the second virtual machine responsive to the first performance data and the second performance data; and a migration module to migrate at least one of the first data for the first virtual machine to the first storage tier or the second data for the second virtual machine to the second storage tier.

3. A system according to claim 1, wherein the auto-tiering controller includes a resource matrix generator implemented using at least a processor, to generate a resource matrix correlating the first virtual machine and the second virtual machine with each of the plurality of storage tiers and a plurality of resources for each of the plurality of storage tiers using the first performance data and the second performance data.

4. A system according to claim 3, wherein the resource matrix generator includes a metric converter implemented using at least the processor, to convert a first performance metric for the first virtual machine in each of the plurality of storage tiers into a second performance metric for the first virtual machine in each of the plurality of storage tiers according to a second resource of the plurality of resources.

5. A system according to claim 4, wherein the first performance metric includes a first average I/O latency data for the first virtual machine.

6. A system according to claim 1, wherein:

the auto-tiering controller includes a linear regression module to perform a first linear regression on the first performance data and to perform a second linear regression on the second performance data; and the auto-tiering controller is operative to select the first storage tier to store the first data for the first virtual machine and to select the second storage tier to store the second data for the second virtual machine responsive to the first linear regression and the second linear regression.

7. A system according to claim 6, wherein the auto-tiering controller is operative to select the first storage tier to store the first data for the first virtual machine and to select the second storage tier to store the second data for the second virtual machine using estimated average I/O latencies for the first virtual machine and the second virtual machine responsive to the first linear regression and the second linear regression.

8. A system according to claim 1, wherein the auto-tiering controller is operative to select a first storage tier to store the first data for the first virtual machine, to select a second storage tier to store the second data for the second virtual machine, and to migrate at least one of the first data for the first virtual machine to the first storage tier or the second data for the second virtual machine to the second storage tier responsive to the first performance data and the second performance data once per migration epoch.

9. A system according to claim 8, wherein:

the first performance data includes first performance data from a plurality of monitoring epochs within the migration epoch; and the second performance data includes second performance data from the plurality of monitoring epochs within the migration epoch.

10. A system according to claim 1, further comprising:

a first virtual machine server storing the first virtual machine; and a second virtual machine server storing the second virtual machine.

11. A system according to claim 10, wherein the first virtual machine server includes an I/O filter to generate the first performance data modelling the performance of the first virtual machine in the plurality of storage tiers.

12. A system according to claim 11, wherein the I/O filter is operative to inject latency into a plurality of I/O commands from the first virtual machine, the plurality of I/O commands including the first I/O command, and determine an average I/O latency for the first virtual machine responsive to the injected latency.

13. A method, comprising:

receiving first performance data modelling the performance of a first virtual machine in a plurality of storage tiers;

receiving second performance data modelling the performance of a second virtual machine in the plurality of storage tiers;

generating a resource matrix correlating the first virtual machine and the second virtual machine with each of the plurality of storage tiers and a plurality of resources for each of the plurality of storage tiers using the first performance data and the second performance data;

selecting a first storage tier of the plurality of storage tiers to store first data for the first virtual machine using the resource matrix;

selecting a second storage tier of the plurality of storage tiers to store second data for the second virtual machine using the resource matrix; and migrating at least one of the first data for the first virtual machine to the first storage tier or the second data for the second virtual machine to the second storage tier, wherein selecting the first storage tier to store the first data for the first virtual machine and selecting the second storage tier to store the second data for the second virtual machine optimizes the performance of all virtual machines across the plurality of storage tiers, wherein selecting the first storage tier to store the first data for the first virtual machine and selecting the second storage tier to store the second data for the second virtual machine factors in a change in performance resulting from migrating the at least one of the first data for the first virtual machine to the first storage tier or the second data for the second virtual machine to the second storage tier, and wherein selecting the first storage tier to store the first data for the first virtual machine and selecting the second storage tier to store the second data for the second virtual machine factors in a migration cost of migrating at least one of the first data for the first virtual machine to the first storage tier or the second data for the second virtual machine to the second storage tier.

14. A method according to claim 13, wherein:
selecting a first storage tier of the plurality of storage tiers to store first data for the first virtual machine using the resource matrix includes selecting the first storage tier of the plurality of storage tiers to store first data for the first virtual machine using the resource matrix and specialization information for each of the plurality of storage tiers; and
selecting a second storage tier of the plurality of storage tiers to store second data for the second virtual machine using the resource matrix includes selecting the second storage tier of the plurality of storage tiers to store second data for the second virtual machine using the resource matrix and the specialization information for each of the plurality of storage tiers.

15. A method according to claim 14, wherein the specialization information for each of the plurality of storage tiers identifies whether each of the plurality of storage tiers supports each of the plurality of resources.

16. A method according to claim 15, wherein the first performance data modelling the performance of the first virtual machine in the plurality of storage tiers includes a plurality of data points correlating average Input/Output (I/O) latencies for the first virtual machine with injected latencies.

17. A method according to claim 13, wherein receiving first performance data modelling the performance of a first virtual machine in a plurality of storage tiers includes:
receiving a plurality of first I/O commands from the virtual machine at an I/O filter;
injecting a first latency into each of the plurality of first I/O commands; and
calculating a first average I/O latency for the virtual machine for the plurality of first I/O commands.

18. A method according to claim 13, wherein the migration cost of at least one of the first data for the first virtual machine to the first storage tier or the second data for the second virtual machine to the second storage tier includes a migration time required to migrate the at least one of the first data for the first virtual machine to the first storage tier or the second data for the second virtual machine to the second storage tier.

19. An article, comprising a non-transitory storage medium, the non-transitory storage medium having stored thereon instructions that, when executed by a machine, result in:
receiving first performance data modelling the performance of a first virtual machine in a plurality of storage tiers;
receiving second performance data modelling the performance of a second virtual machine in the plurality of storage tiers;
generating a resource matrix correlating the first virtual machine and the second virtual machine with each of the plurality of storage tiers and a plurality of resources for each of the plurality of storage tiers using the first performance data and the second performance data;
selecting a first storage tier of the plurality of storage tiers to store first data for the first virtual machine using the resource matrix;
selecting a second storage tier of the plurality of storage tiers to store second data for the second virtual machine using the resource matrix; and
migrating at least one of the first data for the first virtual machine to the first storage tier or the second data for the second virtual machine to the second storage tier,
wherein selecting the first storage tier to store the first data for the first virtual machine and selecting the second storage tier to store the second data for the second virtual machine optimizes the performance of all virtual machines across the plurality of storage tiers,
wherein selecting the first storage tier to store the first data for the first virtual machine and selecting the second storage tier to store the second data for the second virtual machine factors in a change in performance resulting from migrating the at least one of the first data for the first virtual machine to the first storage tier or the second data for the second virtual machine to the second storage tier, and
wherein selecting the first storage tier to store the first data for the first virtual machine and selecting the second storage tier to store the second data for the second virtual machine factors in a migration cost of migrating at least one of the first data for the first virtual machine to the first storage tier or the second data for the second virtual machine to the second storage tier.

20. An article according to claim 19, wherein receiving first performance data modelling the performance of a first virtual machine in a plurality of storage tiers includes:
receiving a first I/O command from the virtual machine at an I/O filter;
injecting a first latency into the first I/O command; and
calculating a first average I/O latency for the virtual machine for the first I/O command.

* * * * *